United States Patent [19]
Göde

[11] Patent Number: 5,645,693
[45] Date of Patent: Jul. 8, 1997

[54] PLANT FOR SEA WATER DESALINIZING USING SOLAR ENERGY

[76] Inventor: Gábor Göde, 1126 Budapest, Böszörményi út 3/a, Hungary

[21] Appl. No.: 516,509

[22] Filed: Aug. 18, 1995

Related U.S. Application Data

[63] Continuation of Ser. No. 170,237, filed as PCT/HU91/00028, Jan. 28, 1991, published as WO93/00299, Jan. 7, 1993, abandoned.

[51] Int. Cl.⁶ ............................ B01D 3/10; C02F 1/14
[52] U.S. Cl. ............ 202/173; 60/641.9; 126/600; 126/690; 159/46; 159/903; 159/DIG. 16; 202/176; 202/177; 202/205; 202/234; 203/11; 203/22; 203/DIG. 1; 203/DIG. 8; 203/DIG. 17; 203/DIG. 20
[58] Field of Search ...................... 202/176, 177, 202/205, 241, 234, 172, 173, 267.1, 185.1; 159/903, 46, 24.1, DIG. 16, DIG. 15; 203/11, 22, 10, DIG. 1, DIG. 17, DIG. 20, DIG. 8; 60/641.9, 641.8; 126/600, 690

[56] References Cited

U.S. PATENT DOCUMENTS

| | | | |
|---|---|---|---|
| 3,032,482 | 5/1962 | Shoemaker | 203/DIG. 20 |
| 4,046,640 | 9/1977 | Carson | 203/11 |
| 4,079,591 | 3/1978 | Derby et al. | 60/641.8 |
| 4,327,552 | 5/1982 | Dukess | 203/DIG. 20 |
| 4,329,205 | 5/1982 | Tsumura et al. | 207/174 |
| 4,330,373 | 5/1982 | Liu | 202/174 |
| 4,340,031 | 7/1982 | Niedermeyer | 126/690 |
| 4,749,447 | 6/1988 | Lew | 202/177 |
| 5,053,110 | 10/1991 | Deutsch | 203/DIG. 20 |

FOREIGN PATENT DOCUMENTS

| | | |
|---|---|---|
| 3232658 | 3/1984 | Germany . |
| 3509599 | 9/1986 | Germany . |
| 3509601 | 9/1986 | Germany . |

OTHER PUBLICATIONS

IBM Technical Disclosure Bulletin, vol. 25 No. 2, issued 1982 Jul. by IBM Corp., O. Alameddine, "Self–Regulating Vacuum Desalination", pp. 795–797.

*Primary Examiner*—Virginia Manoharan
*Attorney, Agent, or Firm*—Keil & Weinkauf

[57] ABSTRACT

An apparatus for desalination of sea water by the utilization of solar energy, advantageously accompanied by electric power generation, containing a heat caption unit (1) serving as a heat source, a sea water collecting tank (10), a pre-heating tank (11), a heat receiver (20), and evaporators (2,3,4) connected in line, and distilled water storage tanks (13). The sea water collecting tank (10) and the pre-heating tank (11) that pre-heats the sea water and cools the distilled steam are situated beside each other at different level, and the adjoining walls of the two tanks have an opening for through-flow (11a) or a through-flow tube; the discharge duct (8) of the pre-heating tank (11) is led into the evaporators where the first evaporator (2) is provided with a heater (72) heated by the heating agent, the second and the subsequent evaporators (3) are provided with a heating system consisting of pipe rings (73a) utilizing hot vapor and pipes connecting the pipe rings.

11 Claims, 17 Drawing Sheets

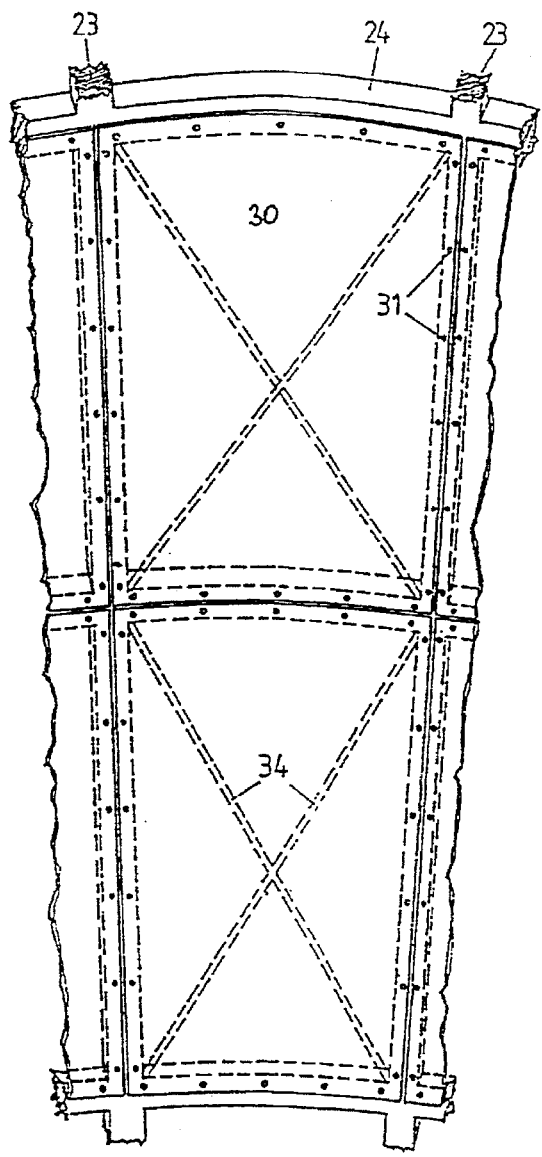
FIG. 3a.
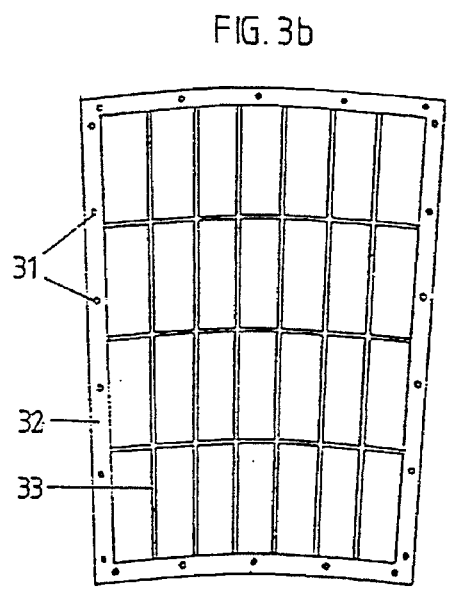
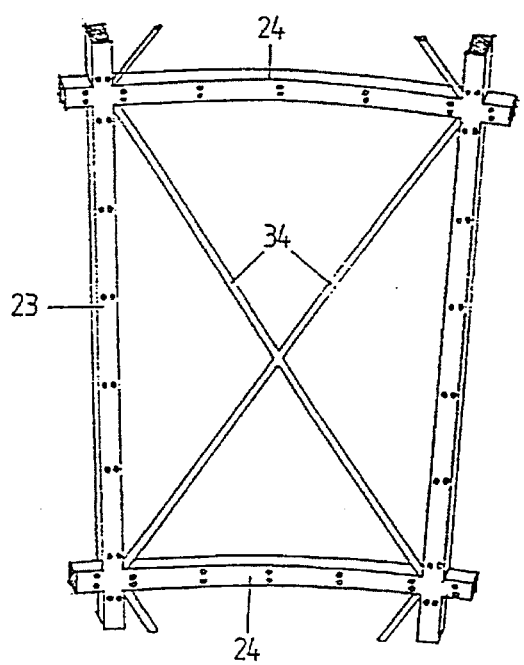
FIG. 3d.
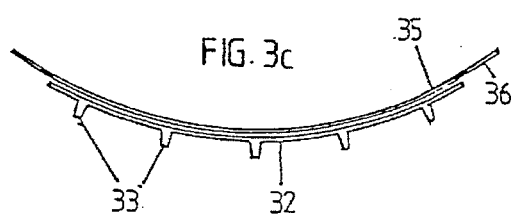
FIG. 3c

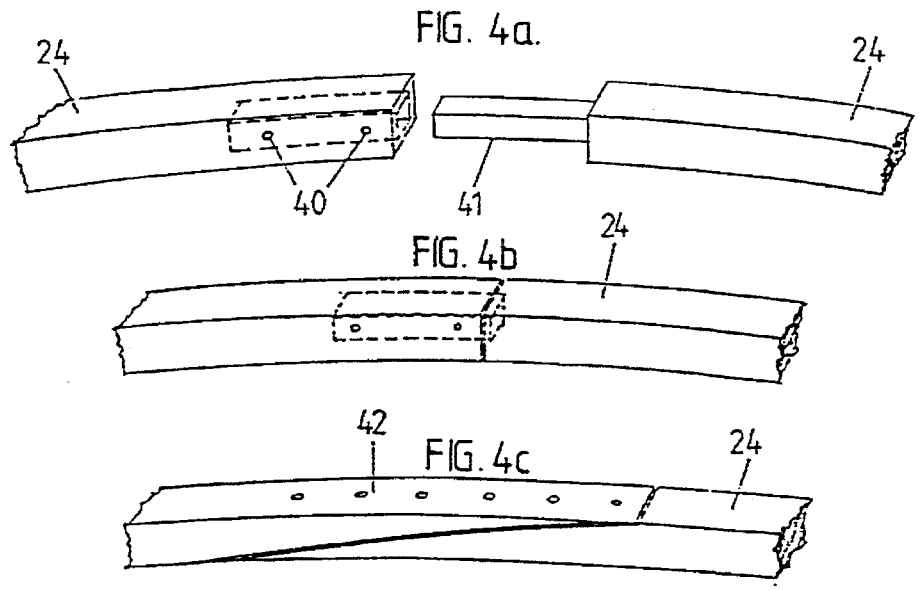
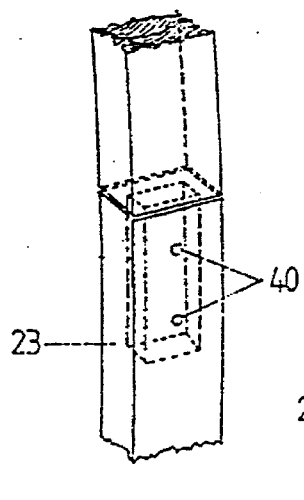 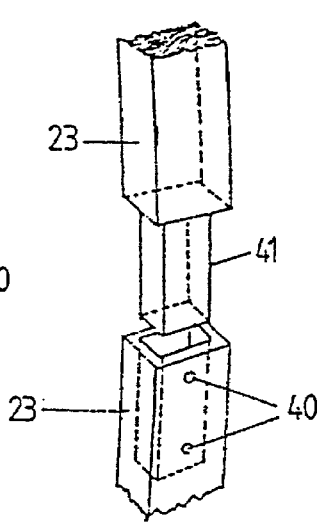 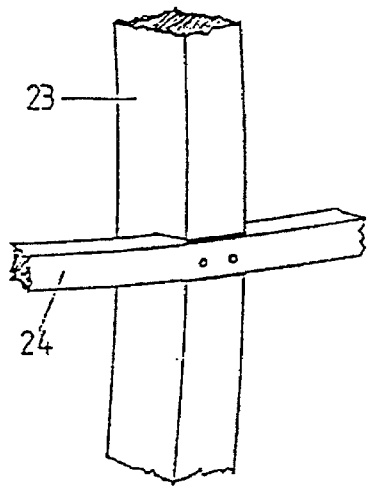
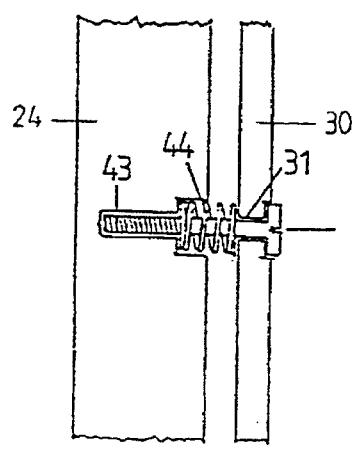 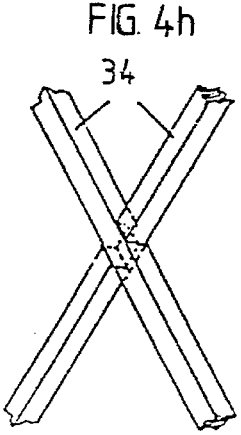

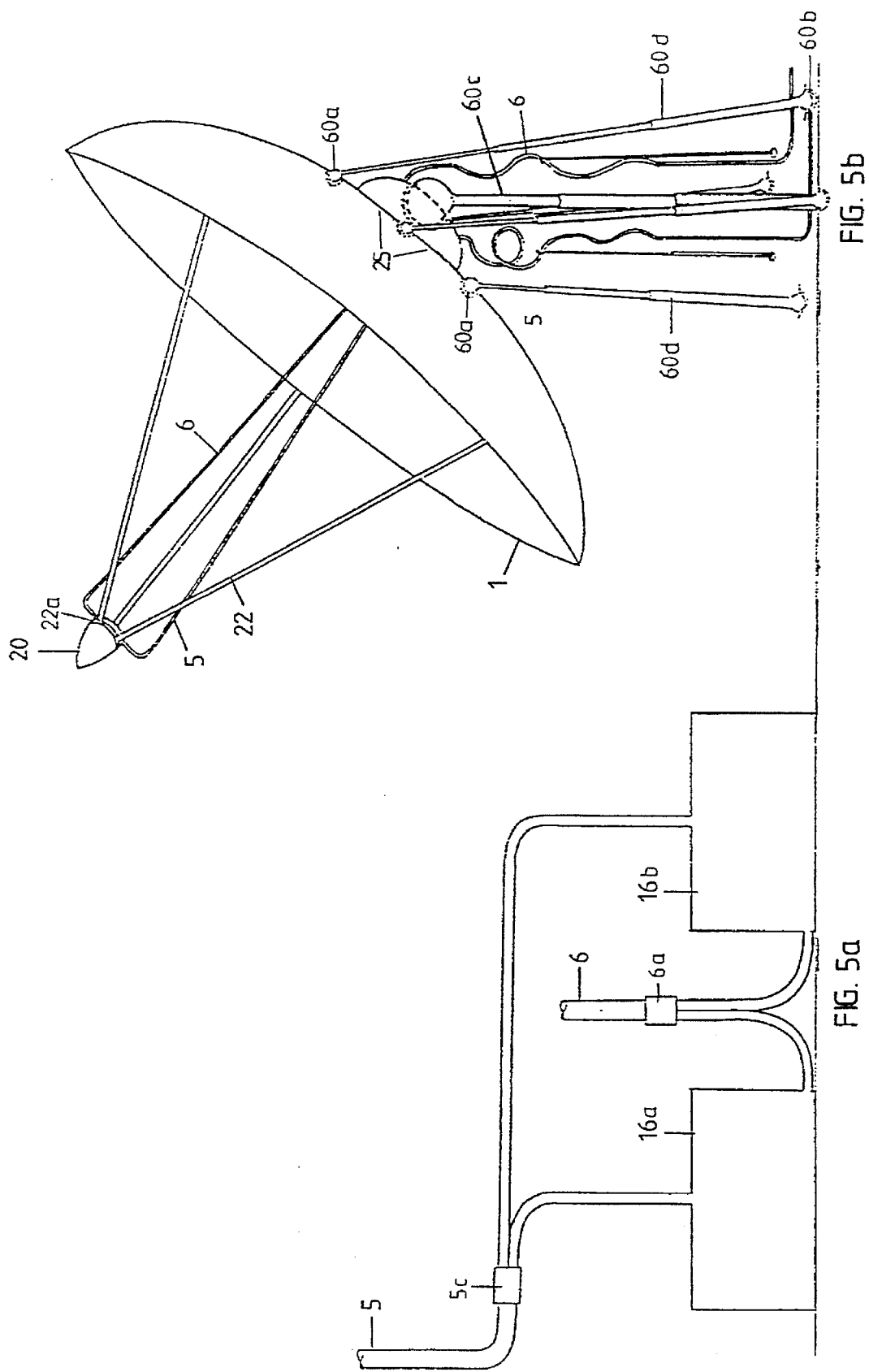

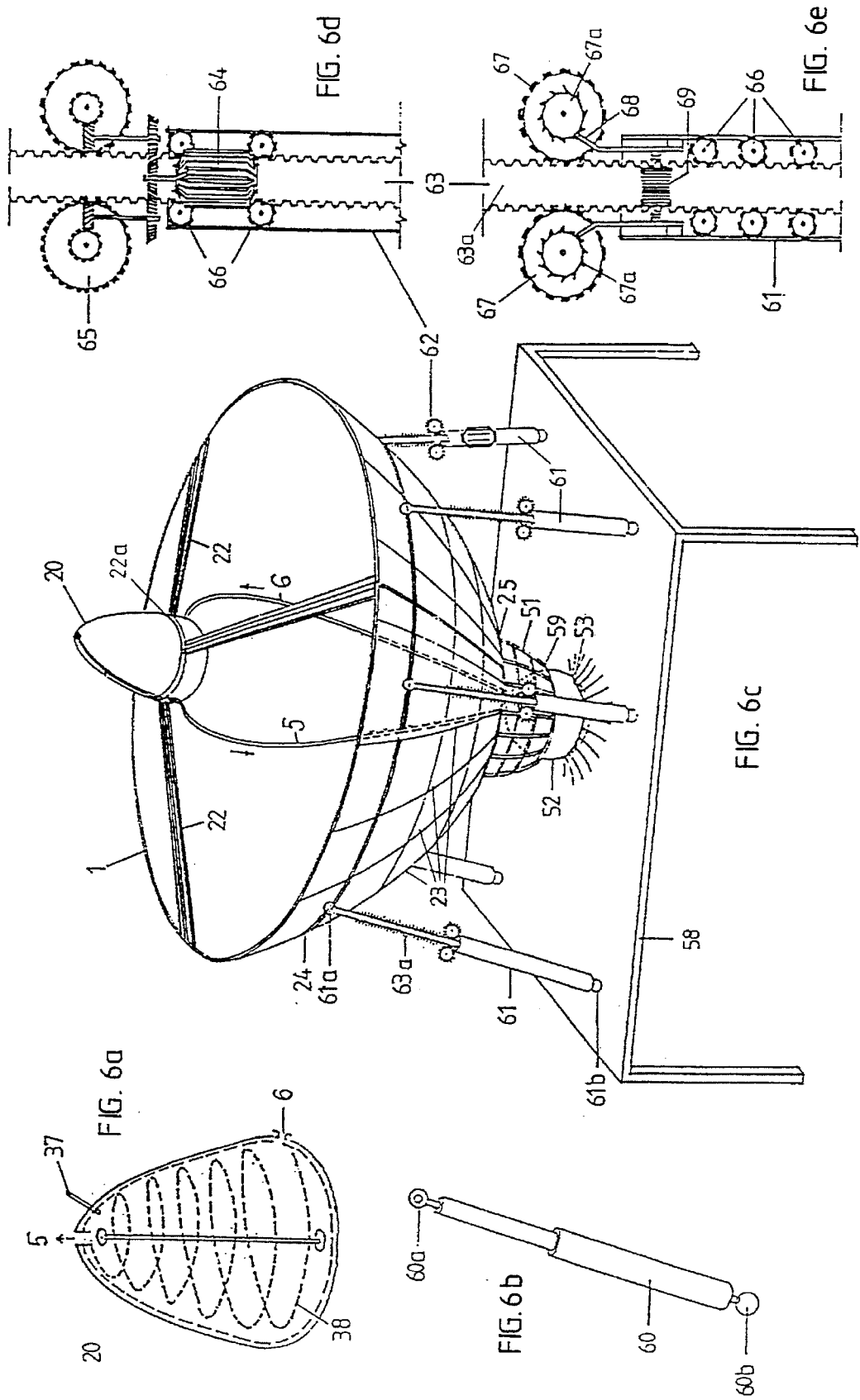

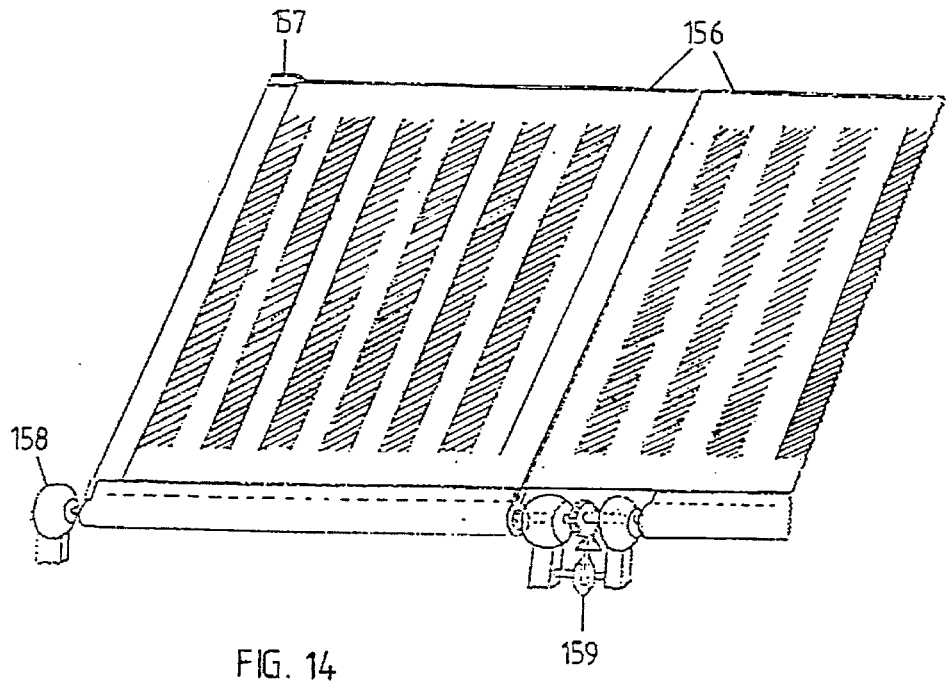
FIG. 14
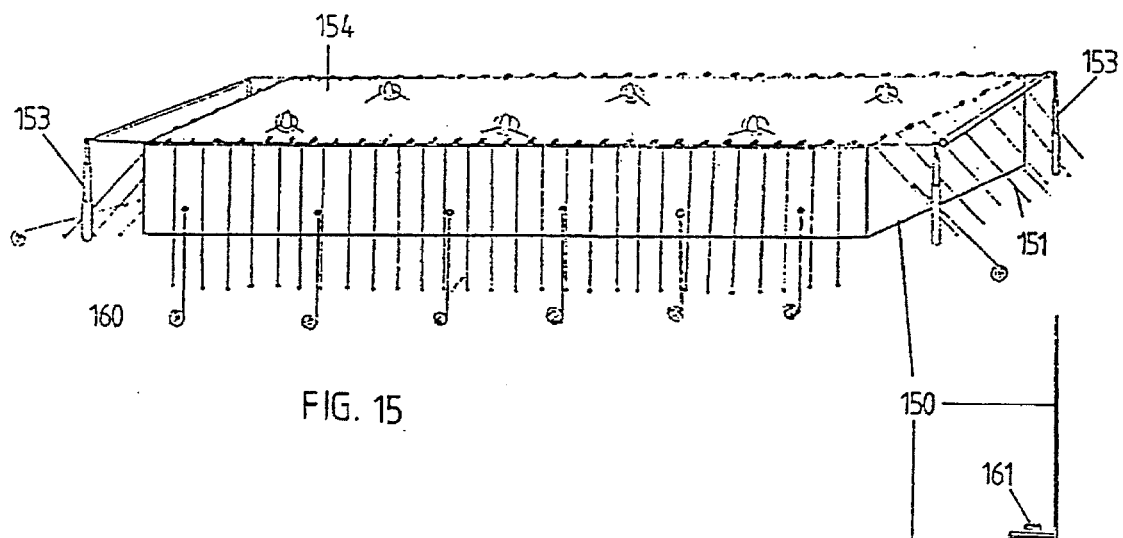
FIG. 15
FIG. 15a

PLANT FOR SEA WATER DESALINIZING USING SOLAR ENERGY

This application is a continuation of application Ser. No. 08/170,237, filed as PCT/HU91/00028, Jun. 28, 1991 published as WO93/00299, Jan. 7, 1993, abandoned.

The invention is aimed at a plant for sea water desalinizing using solar energy preferably accompanied by electric power generation. The plant consists of the following units: sea water storage tank, evaporator tank or tanks connected to the pre-heating tank, thermal source producing heat for evaporation, connected to the evaporator tank, and storage tank for distilled water evaporated in the evaporator tank and condensed in the heat-exchanger.

A significant number of the countries by the seaside and the tropical and subtropical ones as well as the vast insular world of the tropics have to cope with the problem of the supply of potable water being not always available even now at a reasonable price Potable and industrial water supply of large cities and industrial establishments of the mentioned areas has already been solved by means of sea water desalinizing but potable water to small seaside habitations must be transferred either from long distances, or their needs should be covered partly by the potable water produced in large desalinizing plants. Apart from being expensive, both solutions set limits to water consumption.

At present there are seven important traditional processes for sea water desalinizing, i.e.:

Thermocompression

Ion-exchanging and electrolysis

Single-flow topping in more stages

Topping in more stages by means of air circulation

Reverse osmosis

Multi-effect evaporation and

Mechanical steam compression.

Apart from the methods described above, there are also processes using solar energy for desalinizing.

Thermocompression can be performed in one or more stages. The latter is much more profitable. As far as cost-effectiveness is concerned, it should be mentioned that electric power costs 3,6 times more than steam power. Due to electric power being rather expensive, the application of ion-exchanging and electrolysis gradually loses its importance.

From among the above listed processes, reverse osmosis can be considered as the most efficient method, since it requires 33–50% less power compared to the other processes. This method requires water pretreatment too by decarbonization using caustic lime, partial softening by means of sodium carbonate, then desilication for which purpose sodium aluminate and ferrochloride are to be used. The water is then flocculated by means of filters, and finally is filtered by sand. In the evaporation processes, steam is to be generated in traditional crude oil-, coal- or gas-fired boilers, it is then conducted into the single-effect or multiple-effect evaporators provided with heating pipes. Being more cost-effective, generally the multiple-effect evaporators are used at present. The vapor produced in the evaporator is routed through the drop-catcher where it is cooled to be condensed. If a multiple-effect evaporator is used, the condensation of vapor—conducted through the heating pipe of the subsequent evaporators—, generates heat energy which can be utilized. The condensed vapor is then taken off.

The equipment and processes briefly described above are based on some of the traditional energies and sources of energy that should be taken into consideration at their implementation. Due to the considerable quantity of fuel required for their operation, these units can be installed only where continuous power supply is undisturbed and the unconditionally required infrastructure (road and electric network, public services, etc.) is available.

High operating expenses and considerable environment pollution during their operation mean further disadvantages of these methods.

Solar energy plants known so far apply flat collectors for heating salt-water. A thermal pump will increase the temperature of the water so heated which is then submitted to evaporation by vacuum.

There is another process which uses heated water in the flat collectors as heat-carrying agent that is passed into a Rankine boiler where Freon 11 of low boiling point is evaporated. This high-pressure gas, operating a turbogenerator, generates electric power, while the evaporation of the salt water is performed by a heat pump using the condensation heat energy.

The greatest disadvantage of these processes presents itself in the low efficiency of the flat collectors used for energy collection and in the fact that additional power source (electric power) is also required for the evaporation of salt water. Contrary to the traditional as well as the above described solar energy equipment the instant invention uses solely solar energy utilizing the collected and concentrated thermal power of solar radiation at a very favorable efficiency.

The aim of the invention is the implementation of an equipment that is capable of supplying even small habitations with potable water in a cost-effective manner, at low cost and without polluting the environment. The invention that meets totally this aim, is based on the principle of using parabolic collectors composed of module elements from which a collecting unit of the required size can be obtained. This construction will enable the heating of the heat carrying agent up to several hundreds centigrades where evaporation consequently, can take place at a more favorable efficiency.

On basis of those mentioned above, the most general realization of the invention presents itself in an equipment for desalination of sea water by the utilization of solar energy, advantageously accompanied with electric power generation, containing the heat caption unit 1 that automatically follows the movement of the sun serving as a heat source, the sea water collecting tank 10, the pre-heating tank 11, the heat receiver 20 that ensures the energy supply, and the evaporators 2, 3, 4 connected in line; the distilled water storage tanks 13 characterized by the fact that the sea water collecting tank 10 and the pre-heating tank 11 that pre-heats the sea water and cools the distilled steam are situated beside each other by level difference and that the adjoining walls of the two tanks have an opening for through-flow 11a or a through-flow tube.

The discharge duct 8 of the pre-heating tank 11 is led into the evaporators where the first evaporator 2 is provided by a heater 72 heated by the heating agent, the second and the subsequent evaporators 3 are provided by a heating system consisting of pipe rings 73a utilizing hot vapor and pipes connecting the pipe rings. Further, parabolic collector(s) 1 made up of module elements serve(s) as heat caption unit(s) for the heating of the heat transferring agent that heats the first evaporator 2. Its (their) heat collecting unit(s) that hold(s) the heating agent is (are) of funnel-shape at the bottom hollow, and the wall of the conical hollow is covered with a high heat-resistant metal or ceramic coating. Inside the heat receiver 20 there are baffle plates 38 or pipe bundles for the heating of the heat transferring agent, where the inlet pipe of the receiver 20 is led to the discharge opening of the first evaporator 2 discharging the cooled agent, while the discharge pipe of the heated agent is led to the hot agent inlet opening of the first evaporator 2.

Another possible construction of the parabolic collector i.e. a big-diameter, movable collector following the position of the sun, requires an extremely expensive and complicated moving structure which means its greatest disadvantage according to the technical literature.

The construction and operaton of the largest (dia. 37.6–41.1 m) movable parabolic collectors, known so far following the position of the sun, are covered by the scientific description of Prof. Dr. Ing. Karl Bammert and Dr. Ing. Ahmed Hegazy: Optimierung yon solar beheizten Hohlraumstrahlungsempfangern mit Paraboloidkollektoren" (FORTSCHRITTBERICHTE DER VDI ZEITSCHRIFTEN Reihe 6. Nr. 160, 1984). Considering the very expensive moving and other structural elements of this type of parabolic collectors, operated up to now with experimental character only, these types have not become popular.

The collector, subject of the present invention, eliminates the disadvantages one has to cope with if the known parabolic collectors with complicated and expensive moving structure and construction are used. This is due to the simple and inexpensive hydraulically actuated ball-and-socket moving structure, as well as to the application of simple, cheap and easily mountable module elements that are suitable for serial production. These advantages make mass production of the unit cost-effective and of high efficiency.

The great advantage of the plastic structure parabolic collector, a subject of this invention, presents itself in its light weight due to its glass-texture reinforced synthetic resin structure of low specific weight that lends an extremely great strength to the unit at the same time. The shape keeping material is easily processable with great accuracy, it is glueable, so the structural elements can easily and quickly be connected even on the site of installation.

The solar collector is parabolic shaped with reflecting internal surface. At the middle it is supported by a ball-and-socket structure bearing the total weight of the unit, rotatable at any direction within a given range, furthermore, it is supported by rods movable in longitudinal direction in a telescope like manner, fixed to one of the reinforced annular ribs. One of the two opposite rods is provided with an electric signal controlled driving structure, while the remaining ones are equipped with controllable interlocking structure fixing their position. The upper orifice of the collector forms a reinforced ring, whereto a supporting unit is connected composed of two or more supporting rods connecting to the supporting ring with their upper end. The receiver, storing the heat transferring agent and heating it by means of solar energy, is fixed here to the supporting ring clamping the rods at their internal end.

The low weight and relatively high mechanical strength of the parabolic solar collector are guaranteed by its frame structure constructed of "vertical", glass-texture reinforced, ovally bent ribs as well as annular rings running perpendicularly to the ribs. The upper ring and the bottom one fix the "vertical" ribs by pin joint which is completed by gluing. The parabolic mirror made of glass-fibre reinforced synthetic resin, composed of segments, with relfecting internal surface is fastened to the frame structure in such a way that the segments are fixed by spring screws with washers enabling their adjustability at focusing. Shape keeping reinforcing ribs applied at the back side of the segments can further increase the mechanical strength of the collector. The sheet bearing the internal reflecting surface is glued to the ribbed back panel.

The ball-and-socket type structure, supporting the collector, consists of the lower bearing part fixed to the foot, with a hemispherical hollow inside, coated by metal-steamed lead, the hollow steel ball which is seated in the lower bearing part, and the bearing part fixed to the lower annular ring of the basket-like upper supporting structure which is fastened to the collector. The steel ball between the two bearing parts is provided with a cover protecting it against dust.

The moving structure of the supporting rods is constructed so that a rack toothed at both sides is connected to the upper part of the telescopic rod, while the lower part of the latter is provided with an electromotor with a gear wheel on its shaft. The gear wheel is joining to the rack fixed to the upper part by means of further gear wheels.

The positioning structure of the supporting rods consists of racks toothed at both sides, joining to the upper part of the telescopic rod, while its bottom part is provided with interlocking forks and an electromagnetic coil releasing the forks. Gear wheels join here at two sides to the rack, while second gear wheels of smaller diameter, with helical toothing serve for their connection. The interlocking forks join to the gear wheels with bevel toothing.

Large size collectors are supported by means of hydraulically driven supporting rods, and there is a main supporting structure at the middle of the collector which is also driven hydraulically.

The receiver of the collector takes approximately the form of a cone with a funnel-like hollow at the bottom The internal wall of the conic hollow is provided with a heat-resistant coating. In the internal part of the suitably dimensioned receiver, the external wall of which is insulated, there are baffle plates following each other spirally upwards, serving for the gradual and efficient heating of the heat transferring agent.

There is another possible construction of the receiver. In this case the internal hollow wall of the receiver is made of pipe coils conducted spirally upwards. The heat transferring agent conducted in the pipe coil will be heated up by the focused sun rays. The pipelines passing the heated heat transferring agent downwards from the receiver of the collector and returning the cooled agent upwards, is conducted through the hole in the center of the collector, through the basket-like upper bearing part placed under the collector, and through the steel ball supporting the collector. The upper bearing part and the steel ball are positioned fixedly compared to each other. There are further pipe sections—in the vicinity of those leaving the steel ball, angularly, preferably perpendicularly positioned to them— which are connected by means of sections provided with articulated elbows protruding into the pipe sections in sealed condition.

The electric machines and units of the equipment are supplied from a power generating unit consisting of heat-exchanger, turbogenerator and condenser, joining also to the receiver of the collector. An advantageous construction of the heat-exchanger is a boiler drum with heat-insulated wall and provided with safety valve, manometer, water gauge, vapor thermometer and water thermometer. The exchanger is equipped with two pipe sections, the upper one serves as the inlet of the hot heat transferring agent, the lower one as the outlet of the cooled agent. These sections are connected in the internal part of the unit by means of a heating system consisting of linings of different diameter, and pipes connecting the latter.

At the bottom part, a feed water tank joins to the heat-exchanger by means of a pipe, provided with a feed-pump, while the turbogenerator is connected to the pipe for the outlet of the generated high-pressure steam at the upper part. The pipe for the expanded steam leaving the turbogenerator is to be conducted into the condenser, preferably into the sea water pre-heating tank, and the outlet pipe of the condenser is conducted into the feed water tank.

The pipelines of the heating system are equipped with circular sheet type ribs guaranteeing more efficient heat rejection.

An advantageous construction of the first evaporator tank is provided with safety valve, manometer, drop catcher, water gauge and cylindrical heaters concentrically surrounding each other whereto linings are placed at both the top and bottom part, perforated at the side facing the radiator. The upper perforated linings are connected with the inlet pipe by the one passing upwards the hot heat transferring agent, while the lower perforated linings are connected by the outlet pipe of the cooled agent.

There are mixing blades inside the first evaporator tank promoting heat transfer, hindering sedimentation on the heater.

The mixing blades are fixed in pairs, in radial direction, opposite to each other, to the vertical supporting rods fastened to horizontal supporting rod fixed to the shaft placed in the axis of the evaporator tank, fitted with bearings at several points, driven at the upper end by an electromotor.

The second and further evaporator tanks of the unit are provided with heating systems utilizing the condensation heat of the hot steam leaving the previous tank. These heating systems consist of linings of different diameters and pipes connecting the linings. The outlet of the steam cooled here will pass through the condensate separator to the heat-exchanger where distilled water is further cooled(in the given case this heat-exchanger can be the sea-water pre-heating tank). There is a vacuum pump in the steam outlet pipe producing vacuum in the tank.

The steam outlet pipe of the last evaporator tank, which is also equipped with vacuum pump, is connected to the heating steam outlet pipe after its condensate separating section, and is also conducted into the heat-exchanger serving for further cooling of the distilled water, or into the sea-water pre-heating tank.

The pre-heating tank of the unit holds a suitably dimensioned shell-and-tube type condensation system cooling the distillate arriving from the evaporator tanks, as well as a further shell and tube type condensation system driving the turbogenerator, performing the condensation of the expanded steam. At the top of the tank there is an electronically controlled feeding pump regulating the pre-heated sea-water supply into the evaporator while the ball journal serving for the deaeration of the tank can be found at the top of the tank.

The sea-water storage tank should be located in the vicinity of the seaside and, should it be required, is to be placed onto legs. The tank is connected with a sea-water conducting hose and a plunger pump for taking out the sea water, placed under the lowest sea-level, provided with filter cloth.

There is a second shell-and-tube type condensation system in the tank, the inlet pipe of which is leading from the pre-treatment tank to the condensate separator that separates the distillate still containing some steam, while its outlet pipe is conducted into the distilled water storage tank.

The sea-water storage tank is provided with aeration pipe, float and level regulator.

The distilled water storage tank is placed under ground level for further cooling of the water and keeping it at low temperature, and is provided with an aerator unit,a level indicator,a well-pipe and a water take-out unit, preferably a plunger pump.

BRIEF DESCRIPTION OF THE DRAWINGS

The attached drawings show the different units of an exampling equipment in a more detailed manner, i.e.: Figures:

1. Location sketch of the equipment
2.*a.b.c.* Structural sketch of the solar collector
3.*a.b.c.d.* Sketch of the collector segments
4.*a.b.c.d.e.f.g.h.* Connection sketch of the rib elements of the collector
5.*a.b.* Sketch of the heat receiver tanks and the collector supporting structure
6.*a.* Sketch of the receiver tank
6.*b.* Sketch of the telescopic supporting structure
6.*c.* Sketch of the elements supporting and moving the collector
6.*d–e.* Sketch of the structure moving and bracing the collector
7. Sketch of the evaporator tanks connected in line
8. Cross section of the first evaporator tank
8.*a.b.c.* Different designs of the cylindrical heating system of the first evaporator tank
9. Sketch of the power generating unit containing the heat-exchanger, turbogenerator and the condenser.
10. Location sketch of the sea-water storage tank, the pre-heating unit and the distilled water storage tank
11. Sketch of a small size sea-water evaporator with a collector following the direction of the sun
12.*a.b.* Sketch of the small size, portable sea-water evaporator
13.*a.b.c.* Sketch of the system protecting the collectors against windstorm
14. Sketch showing the structure of the sidewall of the protecting system under FIG. 13.
15. Perspective sketch of the protective system (FIG. 13.) showing the elements fixing the corners.
15.*a.* Sketch showing the elements fixing the side walls.
16.*a.b.c.* Drawing of the supporting rods stretching the cover sheet.

DESCRIPTION OF THE PREFERRED EMBODIMENTS

Figure 10:
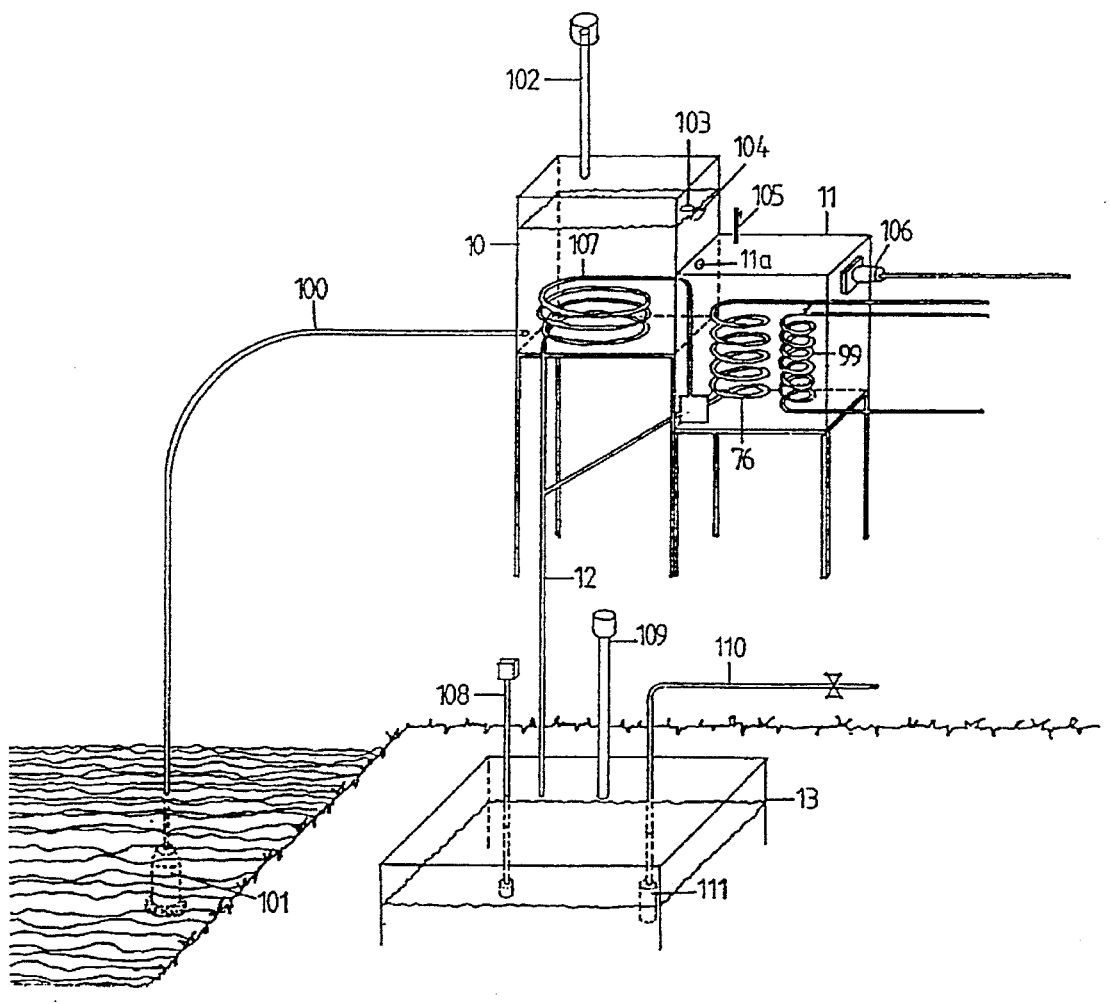

The unit shown in FIG. 10. is composed of a pre-heating and vapor condensing tank 11, and a reinforced concrete sea-water collecting and storage tank 10 located in the vicinity of the sea-side, at a height guaranteeing the required run-off, or placed onto legs. The sea-water storage 10 tank is completed with the plastic hose 100 taking out sea-water, connected to the tank itself and with the plunger pump 101 provided with filter cloth. The tank 10 is completed also with aerator pipe 102, float 103 and water level regulator 104. The residual vapor originating from distillation will be condensed in the shell-and-tube type condensation system 107 mounted in the storage tank 10. The condensed water is admitted into the distilled water storage tank 13 through an outlet pipe 12.

The pre-heating (vapor condensation) tank 11 is located close to the storage tank 10 built to it, but at a lower level. The two tanks 10 and 11 are connected by a hole or line 11.*a* through which the pre-heating tank can be continuously filled with sea-water. At the time of the first filling, the tank 11 is deaerated through the ball journal 105 mounted at the top of the tank 11.

The pre-heating tank 11 is provided with a suitably dimensioned shell-and-tube unit 76 serving for the cooling of the high temperature distillate arriving from the evaporators 3, 4 and for the condensation of the steam expanded in the turbogenerator of the power generating unit 96. At the upper part of tank 11 there is an electronically controlled feed pump 106 regulating the feeding of the pre-heated sea water into the evaporators. The outside surface of the pre-heater tank 11 is painted black to pre-heat the sea water. It is also possible to design a flow-system sea water storage tank 11 which would increase the efficiency of condensation.

In order to avoid the warming of the water—rather to cool it—, the distilled water storage tak 13 is located underground. Distilled water—condensed in the sea-water storage tank 10 and the pre-heating tank 11—will arrive here by gravity through an outlet pipe 12. Tank 13 is completed by an aerator 109, a water level indicator 108, a pipeline 110 and a plunger pump 111.

Figure 5:
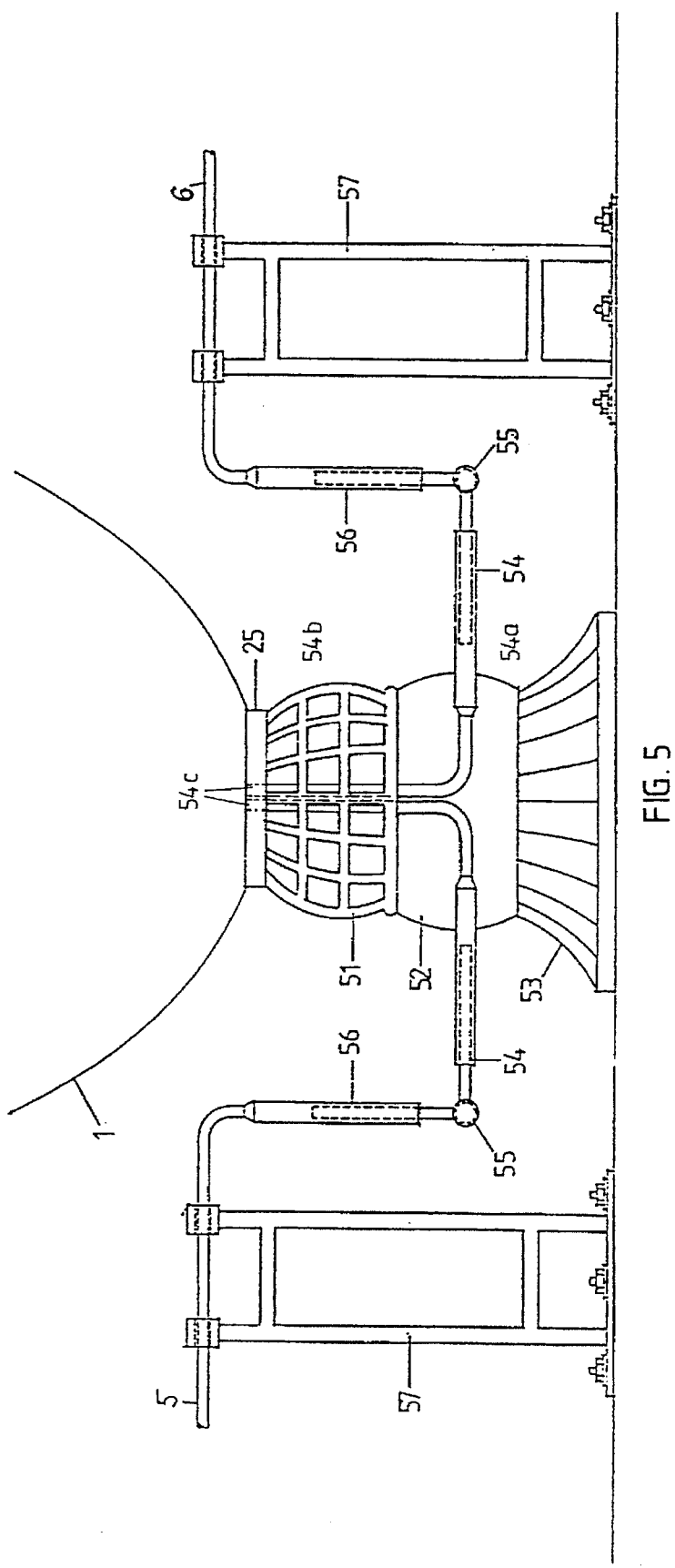

The parabolic collector 1 shown in FIGS. 5.b and and 6.c. which can be made in two designs, will supply the energy required for the operation of the unit.

Figure 2A:
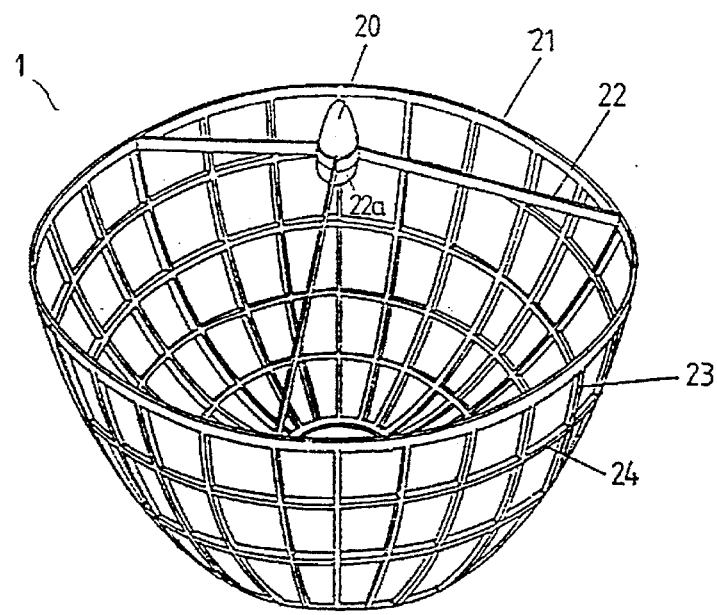
Figure 2B:
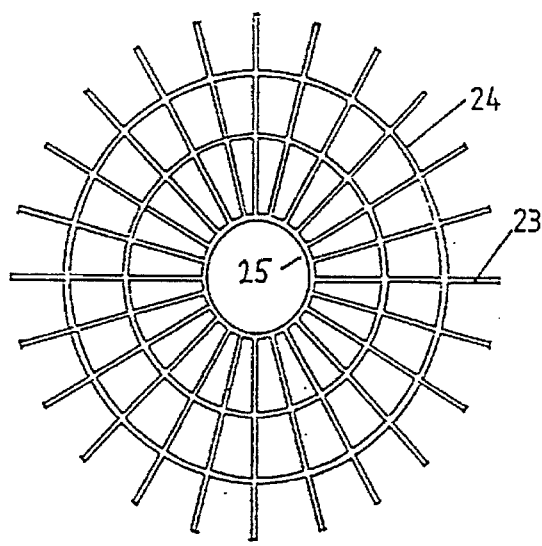
Figure 2C:
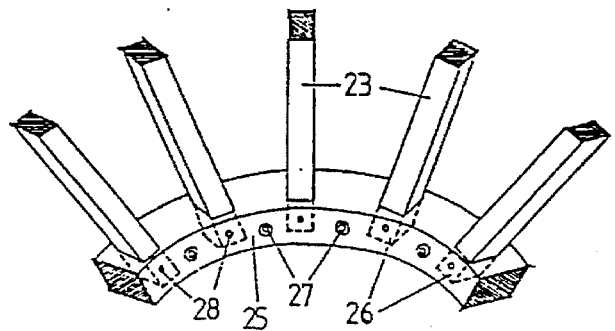

The design shown in FIG. 6.c presents itself as a parabolic collector made of aluminium casting with a wall thickness depending on its diameter, braced by longitudinal and transverse reinforcing ribs at the external surface. The reinforcing ribs 23 are cast together with the collector body and end in a ring 25 provided with bores at the narrow part (FIG. 2.c.). This ring 25 bears a basket-like, hemispheric upper bearing part 51—connected by screw joint—consisting of stainless steel ribs and stiffening members, including a hemispheric steel plate at its narrow part (FIG. 5). At the lower,narrow part of the "basket" there is a ring fastening the ribs, fixing the hemispheric supporting steel plate that holds the collector 1 carrying steel ball 52 seated therein to approximately one-third its diameter. The parabolic collector carrying steel ball 52, covered to be protected against dust, is made of stainless steel, its diameter and wall thickness are dimensioned to the requirements. The steel ball 52 seats with its lower third part in the hemispheric bearing 53 which is coated by metal-steamed lead and is designed in the geometric center of the carrying structure (58). The ball is turnable in any direction.

This ball-and-socket design guarantees the turning of the collector at any direction, furthermore, this structure is capable of holding the total weight of the collector.

There are several fixing telescopic 60 or supporting 62 rods (FIG. 6.) serving for the regulation of the articulated movement, as well as for fixing the collector in the required position and for its continuous moving. At the bottom part the supporting rods are fixed by means of ball-and-socket joints 60.b., 61.b., their upper part with bolts 60.a.

The supporting structure 58 of the collector 1 is oriented so that it bears a pair of supporting rods without electromotor 61 in East and North direction as well as another pair of supporting rods 62 with electromotor 64 in West and South direction. The small gear wheels 66 in the internal part of the telescope-like part of the supporting rods, between the jacket and the toothed rod, assure the even bearing of the racks 63.

The supporting-moving rods at the East and North side provide for the stability of the collector and enable it to follow the position of the sun. These holding rods are designed so that the toothing of the smaller diameter gear wheels—moving together with the combined double gear wheels 67 connected to the rod-toothing—enable movement in one direction only, thus protecting the collector against accidental displacement in case of a sudden gust of wind. Hydraulic supporting rods 60 will be used for the fixing of large size parabolic collectors, as well as for moving and keeping them in the required direction. These rods are connected to the base by means of ball-and-socket joints 60.b at the lower part, while at the top either ball-and-socket joints 60.a or bolts fix them to one of the reinforced rings 23 of the collector. The main hydraulic support 60.c, being in the extension of the axis of the collector, is connected at the top to the hemispheric bearing -designed at the lower part of the collector—by ball-and-socket joint, while its lower end is fixed to the base.

The lifting forks 68 moved by the sucking coil 69 enable the positioning of the collector (FIG. 6.c.) in the direction of the early morning sun(FIG. 6.e). At operation the collector 1 is always perpendicular to the direction of sunrays. Computer operated electromotors 64 serve for keeping the direction of the collector as required.

The hydraulic moving structure or the toothed holder provided with gear wheels perform the required motions as controlled by the computer.

There are three supporting structures 22 connected to the holding ring 21 placed at the outside orifice of the collector 1.

As they approximate the center, these structures end in a ring 22.a fixing the tank (solar-boiler) 20 filled with the heat transferring agent. The latter will be passed by means of pipelines 5, 6, leaving the tank 20, conducted downwards at the upper and lower opposite sides of the tank, in approximately vertical position. The cold-side pipeline 6 running upwards is conducted from the collector center 1 through a bore, into the internal part of the tank—at its bottom—which is placed in the focus; the hot-side outlet pipeline 5, leaving the outlet opening at the upper part of the tank, is passed up to the inlet opening of the heater of the first evaporator tank through the bore in the collector center 1.

The suitably dimensioned, roughly cone-shaped receiver 20 with insulation coating at the external mantle, serving as a heat collecting unit receiving the heat transferring agent has a funnel-like hollow at the bottom, and is provided with baffle plates 38 mounted upwards in spiral direction serving for the gradual and efficient heating of the heat transferring agent. It is also possible, as per another design, to apply a bundle of tubes laid in the internal part of the tank in circular position that would circulate the agent.

The wall of the conic hollow in the internal part of the tank is provided with highly heat-resistant metal or ceramic coating.

During operation, the funnel-like hollow of the tank 20 will receive the heat rays collected and focused by the collector 1, and will transfer them—in the form of thermal power—directly and by means of the baffle plates 38 or the bundle of tubes to the heat transferring agent in the tank.

The cold heat transferring agent will be fed through the hole at the bottom of the tank, while the hot agent is to be taken out at the top of the same, by means of an electromagnet valve 37 or a thermostat opening at the determined temperature. The tank 20 is provided also with manometer and thermometer. The oil type "Therminal 60" is most practicable to be used as heat transferring agent, considering its flash point being at 319° C. In case of higher temperature, in order to increase efficiency, liquid sodium generally used at solar plants as heat transferring agent is better to be applied for this purpose.

Figure 9:
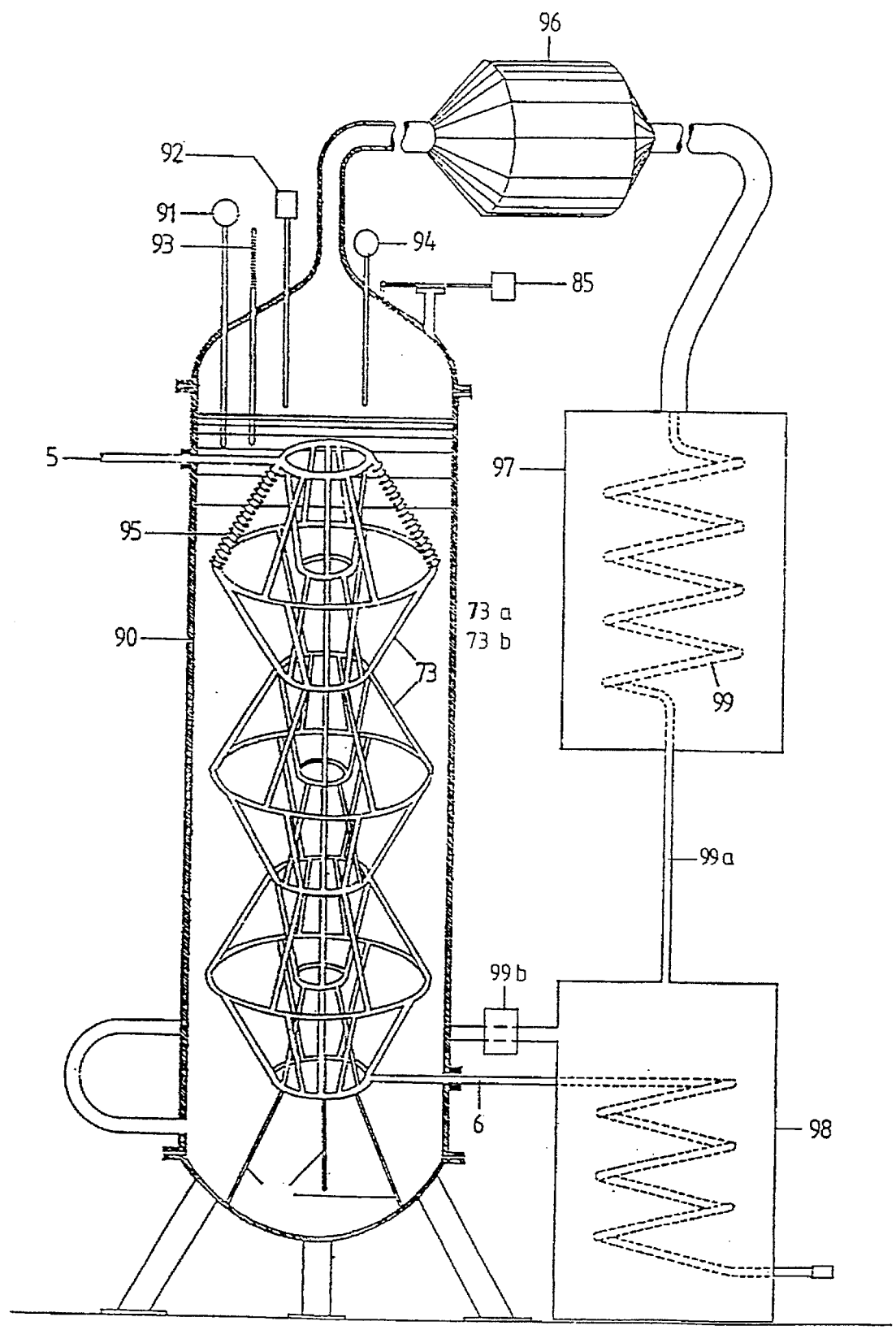

The hot heat transferring agent heated in the tank 20, conducted by a pipeline 5 gets into the upper bearing part 51 through a bore 54.c at the collector center, then it is passed into the steel ball 52—holding the collector—through another bore 54.b (FIG. 5.). At the horizontally determined central, southern part of the external mantle of the steel ball 52, the pipeline passing the hot agent gets into the open air through a bore 54.a, and is continued in a double-wall, suitably fixed 57 pipeline 5 provided with articulated joint 55 operating like a telescope, gets to the first evaporator with cylindrical heater (FIG. 1.) and to the heat exchanger 90 resp. (FIG. 9.). The pipeline 6 of the cold heat transferring agent is conducted upwards, in parallel to the above, in northern direction. In case telescopic movement is applied, the material is passed by means of flexible pipes.

Figure 1:
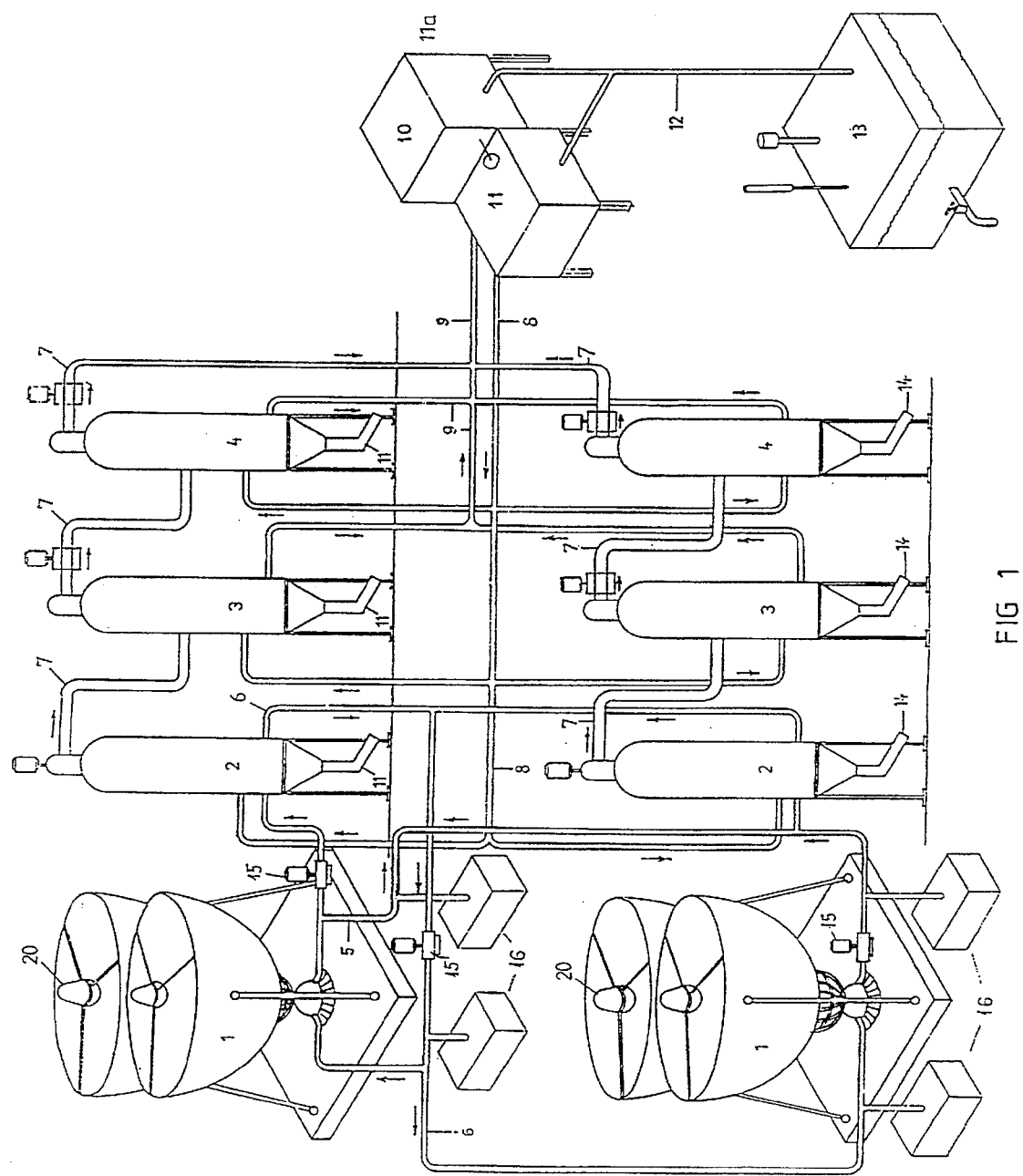

The unit is completed with a heat storage system (FIG. 5) to be employed in case of temporary clouding and in case the daily working time is to be extended. This system consists of the two or more suitably insulated heat-energy storing tanks 16 of the required volume, pumps and heat-insulated pipelines 5, 6 (FIG. 1.) During the noon hours, when the solar irradiation is the strongest, the heat transferring agent heated in the receiver 20 is to be conducted from the collector and passed towards the cylindrical heater of the first evaporator tank 2 /in case of the power generating unit:towards the heat-exchanger/; part of the agent is tapped by opening an electromagnetic valve 5.c mounted on the primary line 5, and gets through a pipeline into the empty tank 16.a where it is collected.

Simultaneously, a pump 15 passes the cooled agent from another totally filled up tank 16.b (connected to the secondary line) toward the receiver by opening an electromagnetic valve 6.a. This filling/emptying proces is continued until the originally empty tank 16.a is completely filled with hot heat transferring agent.

In case of temporary clouding, as well as in the evening when there is no sunshine, the above described process is performed in reverse sequence.

At the end of the working time, when desalinizing (power generation) is terminated,—in case of units using liquid sodium, the pumps discharge the heat transferring agent from the total system into the empty tank, wherefrom the system will be refilled the next morning, before the operation is started. According to another possible construction (FIG. 5.b.), the parabolic collector 1 can be moved so, that a hydraulic support 60.c clamped by fixed joint at the bottom bears the collector 1 at its axial line, where a ball-and-socket joint guarantees free turning. In this case moving is performed by hydraulically operated, telescopic rods 60.d connected at at the bottom to the base, and at the top of the lowest reinforced ring of the collector 1 by ball-and-socket joint. 60.a, 60.b. A computer is applied to synchronize and control these rods.

The lines 5 and 6 passing the cold and hot agent leave the collector at its bottom part and continue in a flexible, then in a fixed pipe.

The internal, reflecting surface of the collector is coated by metal-steamed aluminium to increase reflecting efficiency. In order to increase corrosion-protection and reflecting capacity, this surface is coated by a pair of dielectric films. $MgF_2$ and $CeO_2$ are the best pair for this purpose.

Ceric oxide forms an extremely hard film and increases the reflection capacity of the aluminium ensuring, at the same time, an absolute safe protection of the same against oxidation.

The glass-texture reinforced, synthetic resin frame structure of the parabolic collector 1 is shown by FIGS.: 2., 3. and 4. The frame structure is designed to take the form of a parabolic solid of rotation, where the ovally bent "vertical" ribs 23 are connected by horizontal circular rings (FIG. 2). The top ring 21 and the lowest reinforced one 25 fix the "vertical" ribs 23 by pins 26. The pinned structural elements, designed with great accuracy, guarantee accurate assembly and the forming of the correct shape. Glue injected through bores 28 will strongly adhere the pinned surfaces to each other. The bottom jointing of the frame structure is shown in FIG. 2.c. The collector 1 is connected to the basket-like upper bearing part 51 (FIG. 5.) by means of threaded bolts through bores 27 made in the lowest reinforced ring 25.

The construction and structure of the module segments 30 as well as their fastening are shown by FIG. 3. The total internal surface of the parabolic collector is coated by synthetic resin segments 30 reinforced by multi-layer glass-texture; the segments 30, made of elements processed at the internal 35 and external 32 surface, are glued to each other. Having been glued, the internal sides of the segments will get a reflecting surface as described above.

The back side of the segments is provided with fastening ribs 33 serving for keeping their form. The internal surface 35 is bigger than the external one 32 at each side, and there is a protracting part 36 guaranteeing the correct bearing of the segments 30. Spring screws with washers fix them (FIG. 4.g.).

Though accurate processing will result in an even internal surface and will provide for the required directional angle, still it is possible that we meet with manufacturing shortages or inaccuracy in fitting. These defects can be eliminated by the utilization of spring screws 44 for the accurate fitting of the segments 30 which are to be applied into bores 31 made in the bearing edges of the segments contacting the supporting structure as well as in bores 43 made at the corresponding points of the supporting structure. Cross pieces 34 will strengthen the frame structure to be fixed by pin joint.

FIG. 4. shows the joint fitting system of the supporting structure. The ribs 23 and the rings 24 are connected by similar pin joints. Surfaces embedded into each other will be fixed by glue injected through bores 40. Connection of the ribs 23, rings 24 and cross pieces 34 is performed by pin joint 40 and glue.

The rings 24 with split end 42 are fixed at the overlapped surface by means of screws and glue. The large parabolic collector of light plastic structure, made of modules is, apart from being of a high-capacity unit due to its increased surface, less expensive owing to the cheap structures and moving unit elements in its construction, and can be simply and quickly assembled at the same time.

The evaporators with a volume dimensioned according to the diameter and the capacity of the collector, serve for the production of desalinized water. Beyond the potable water being the primary product, the by-products are important industrial raw materials too.

Figure 7:
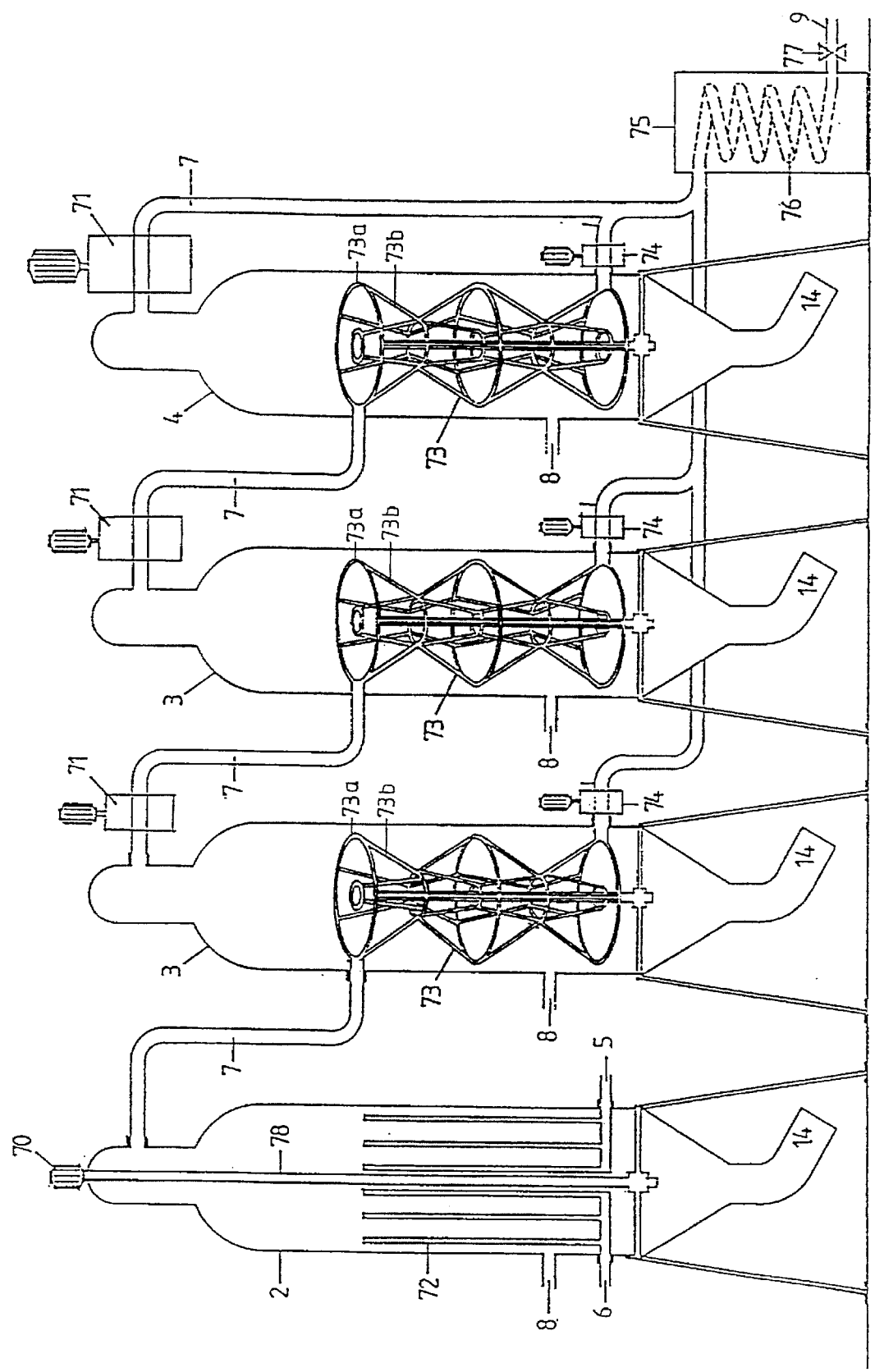

The application of multi-effect evaporators increases the profitability and efficiency of operation. FIG. 7. shows the most practicable connection of the evaporators.

The unit is heated by means of the principle according to which the vapor produced in the first evaporator tank 2 is conducted into the heating system of the subsequent second one, while the vapor of the latter is conducted on in the third one, etc. The tanks are provided with a specially designed 73a, 73b heating pipe system. At the outlet of the heaters 73 condensate separators 74 are applied, so that only condensate will leave the unit. The condensate produced in the last evaporator tank 4 is passed by a pipeline 9 into the preheater 11 and the salt-water storage tank 10 (FIG. 10).

It is practicable to produce vacuum in the second and the subsequent evaporator tanks, thus the boiling point of the solution to be evaporated will become lower and lower.

Vacuum is to be increased gradually starting from the second evaporator tank 3 towards the last one. A condensate separator 74 will remove the condensate of vapors below atmospheric pressure. The obtained distilled water will be passed into the distilled water storage tank 13 (FIG. 10).

Figure 8:
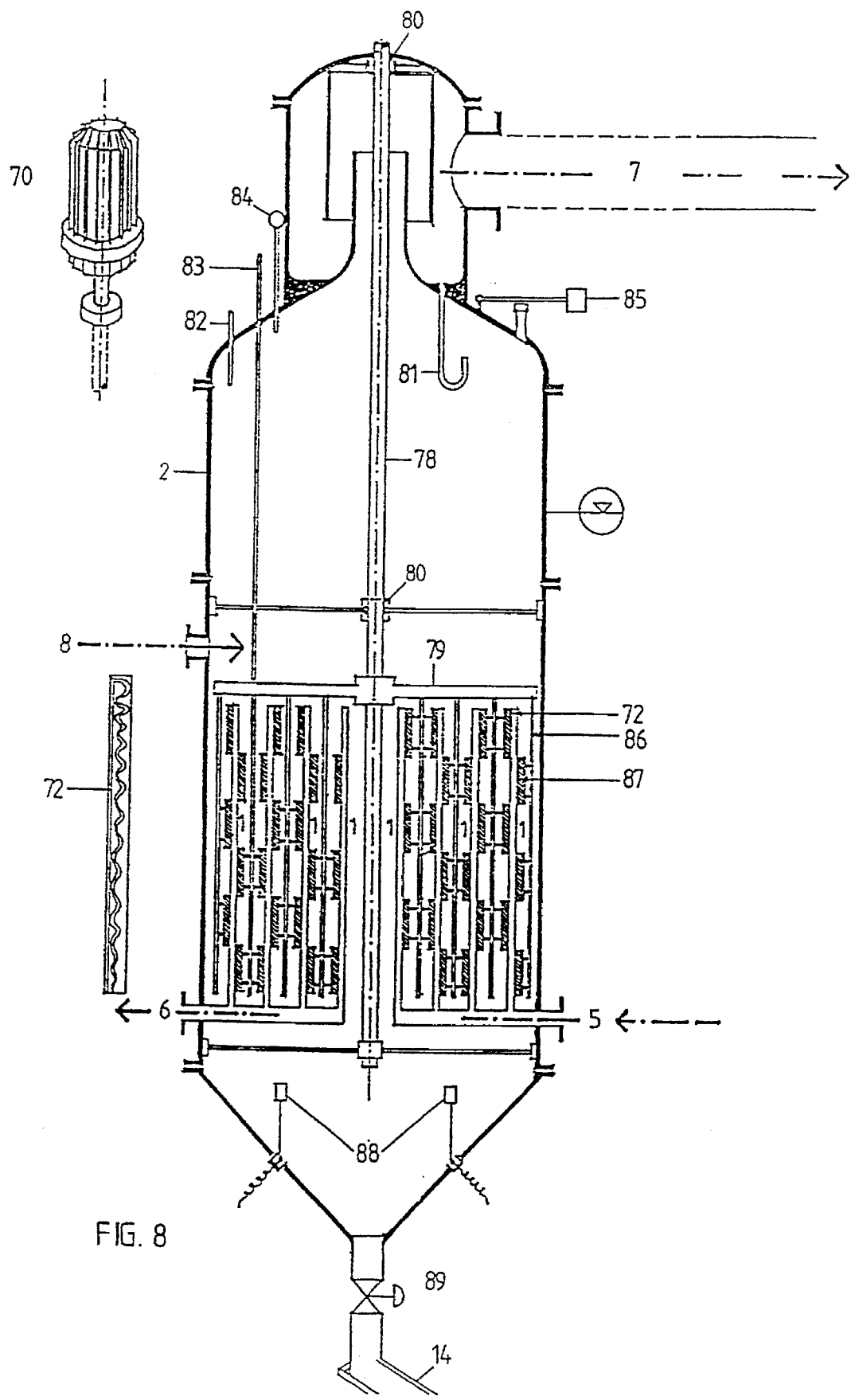
Figure 8C:
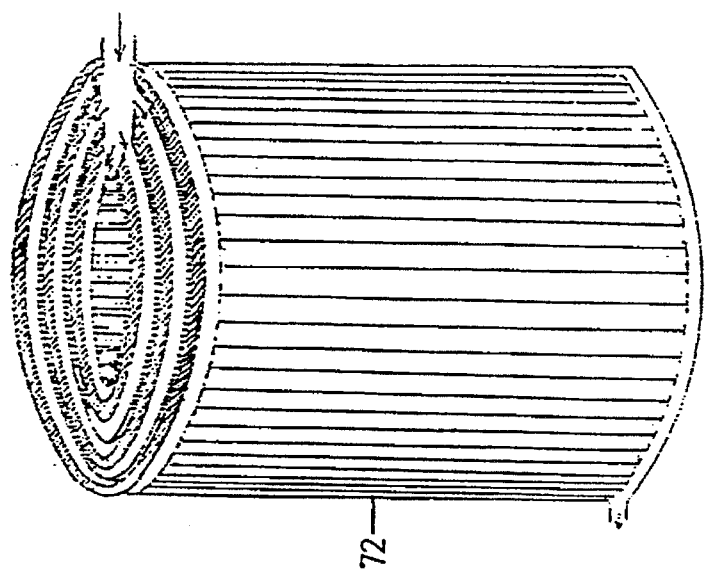
Figure 8B:
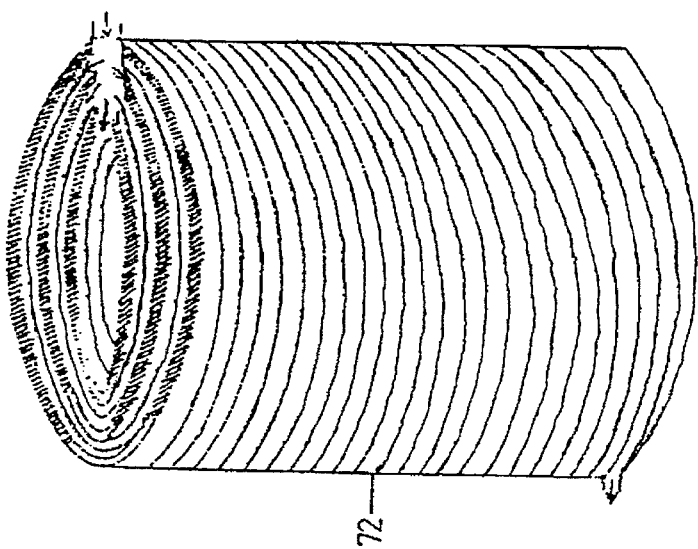
Figure 8A:
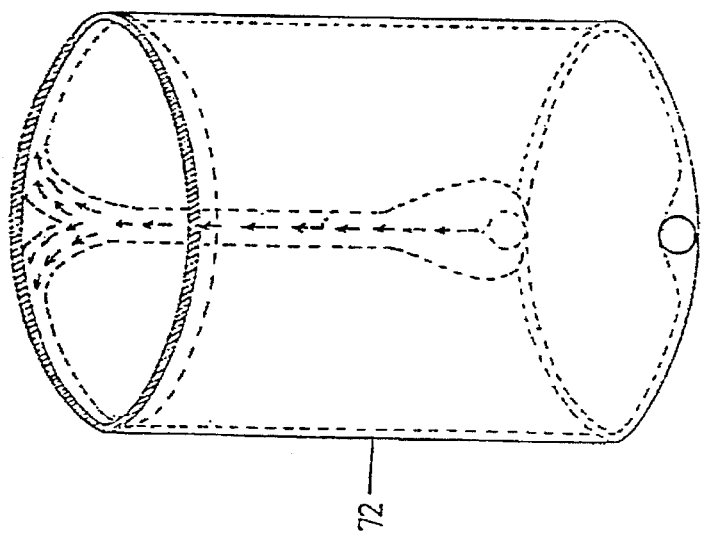

In the first evaporator tank 2, it is practicable to use a liquid agent—instead of hot steam—for heat transfer through the cylindrical heaters (FIG. 8.). The hot heat tansferring agent should be introduced into the heating pipes at the bottom of the cylindrical heater 72 so that a vertical conduction pipe at the inlet side passes the material up to the top point of the heater 72, where a perforated pipe running around the unit spreads it. Then the hot agent streaming downwards through the ribs inside the heater transfers its thermal energy (FIG. 8.a.).

At the side opposite to the inlet, the cooled agent with decreased thermal energy, leaves the evaporator 2 and passes towards the receiving tanks 20 in the collector 1.

In another construction it is also possible to use the evaporator without a mixer, this case a spiral pipe coil going from top to bottom represents the heater (FIG. 8.b.).

Having been fed at the top of the cylindrical heater the hot heat transferring agent passes from the inlet pipe downwards through the spiral pipe while it transmits its thermal energy. Then, having been collected in the storage pipe at the bottom part of the shell tube—at the opposite side—, it leaves the evaporator 2 by means of the outlet pipe and is passed towards the receiving tanks 20 in the collectors 1. In the heater a pump provides for the required flow speed of the agent.

There is a third design, in which the evaporator has no mixer either, and the heaters consist of more, cylindrical, vertical bundles of tubes (FIG. 8.c.), where the top ends of the pipes of the bundle arranged in cylindrical form, join in a horizontally running pipe ring with perforated wall at its lower part. An inlet pipe joins to the horizontal pipe rings.

The lower ends of the pipes forming the cylindrical bundle of tubes also join in a horizontally running pipe ring, having bores on its upper wall, connecting to the outlet pipe.

The pre-heated salt water is to be fed at the part under the cylindrical heaters in the evaporator 2.

The funnel-like part of the evaporator is provided with a gauge indicating the min. and max. values of liquid concentration 88. This gauge is in direct contact with the computer giving signals thereto. The following structural elements are used for the continuous removal of the concentrated brine during operation.

The continuous removal of the concentrated brine produced during operation is performed by means of an adjustable valve 39 as follows: as soon as the brine concentration in the lower, funnel-like part of the evaporator reaches the critical value, the control system, on basis of the signal of the concentration gauge 88, opens the valve 89 at the outlet on the lower part of the tank and keeps it open until the gauge 88 shows the min. value and gives signal, the control system closes the valve 89 then. The evaporator tank is equipped with a water level gauge 83 indicating the level of the water in the evaporator and giving signals to the computer thereon.

Thus, it is possible to measure the quantity of salt water in the evaporator, on basis of which the operation of the salt water feed pump 106 can be controlled (FIG. 10). Evaluating the difference between the value indicated by the water level gauge 83 and the prescribed value, the computer will continuously calculate and control the feeding of sea water into the evaporator.

Heat insulation applied to the evaporator wall will reduce thermal loss.

A manometer 84 and a safety valve 85 contribute to safe operation of the evaporator.

At the top of the evaporator shaft, above the evaporator tank, at its external part, there is an electromotor 70 driving the mixer blades 87. This motor drives the rods 86 holding the cleaning blades fixed onto the supporting structure by means of the rotation of the shaft 80 provided with bearings at several points. The symmetrically positioned blades 87 are capable of removing the settled salt from the total surface of the cylindrical heater.

The evaporator is provided with drop catcher 81, water level gauge 83 and water thermometer 82. The outlet of the concentrated brine by means of discharge pumps or evacuated tanks, the feeding of salt water, the construction of the supporting legs and the instrumentation for safety and other purposes are similar in case of the other evaporator tanks, too. The thermal energy collected in the concentrating and receiving parts of the equipment subject of the patent application (parabolic collector and its accessories) can be used alternatively too:i.e. in parallel with or instead of sea water desalinizing: for power generation. The units required for power generation are shown in FIG. 9.

The heat-exchanger 90 presents itself as a boiler with heat-insulated wall, with a volume, pressure and wall thickness suitable for the electric power requirements of all the electric consumers of the desalinizing process. It utilizes a part of the thermal energy received by the tanks 20 located in the focus of the parabolic collectors 1. The hot heat transferring agent will be introduced into its heating area at the top of the unit through a pipeline 5, while the cooled agent will be discharged at the bottom through another pipeline 6. The heating pipes 73 of special form, arranged at appr. 45° angle, connecting the 73a horizontal circular rings in the heat-exchanger 90 provide for turbulent flow and favorable heat rejection.

In case of power generation, the steam heated up to the required temperature, leaves the heat-exchanger 90 and operates a turbogenerator of the required size 96. Then the exhaust-steam is conducted into a condenser 97 with external water cooling, where the water obtained after the condensation of vapor in the great-surface bundle of tubes or the spiral pipe coil 99 is pumped into the feed water tank 98. Water cooled by sea-water or other desalinized water should be used for the continuous cooling of the condenser 97. The built-in safety valve 85, the manometer 94, the water level gauge 93, the vapor thermometer 92 and the water thermometer 91 guarantee the safe operation of the heat-exchanger.

There is another construction where the receiving tanks 20 in the focus of the parabolic collectors 1 are designed to serve as heat-exchangers 90. In this case liquid sodium or water should be used as cooling medium.

In yet another construction it is also possible to apply the unitis of the Brayton cycle in the receiver 20 of the collector as power generating equipment. In this case air will be used for cooling: the pre-heated air is compressed, then heated up to appr. 1000° C., it is expanded in the turbogenerator.

Part of the expanded hot air is conducted into the pre-heater where the incoming air is pre-heated. The total system (FIG. 1.) will be controlled by a computer.

Before commissioning the units of the equipment, all required data should be input. The computer will continuously display the signals required for starting and operation, will continuously measure, in the meantime, the values received from the instruments, comparing them to the input program, thus performing the automatic control of the complete plant.

The pipeline 5 conducting the hot heat transferring agent is provided with pumps 15 in the required number. The speed of the multi-stage electromotor driving the pumps 15 offers a sufficient flexibility of operation. The speed, as well as switching in/out will be controlled by the computer.

There is an expansion tank 5.d. installed in the pipeline of the heat transferring agent for volume compensation (FIG. 1.)

A battery plant provides for continuous power supply of the unit. The above described generator will serve for its continuous recharging.

The total pipe system of the solar energy utilizing plant will be made of heat insulated, corrosion-resistant metal alloy of the required strength.

The operation of the plan is begun by the filling of the storage tank 10 and the pre-heating tank 11 by means of the plunger pump 101 provided with pre-coat filter, placed in the sea water (deeper than the level of ebb-tide), which starts to work on the instruction of the central control- (The pre-heating tank should be deaerated in case of the first filling). As soon as the equipment operates continuously, salt water is continuously refilled into the storage tank 10.

According to the program, early in the morning—if liquid sodium is used as heat transferring agent—, liquid sodium (discharged the preceding day) will be pumped from the heat-storage tank into the receiving tank, the pipeline—and heating system. The collectors are then positioned to be aimed at the sun. This is performed as follows: on basis of the operation of the sucking coil, the forks—regulating a one-direction movement, fixed onto the guiding—fixing—telescopic rods placed at the eastern side—will be released so as not to get into contact with the toothing of the gear wheels of the smaller diameter. Then, the control system will actuate the multi-stage electromotors—suitable for slow and rapid movement, placed on rods at the western side—, while the gear wheels will be driven at high speed and—since the length of the rods will be extended—, the collector will be turned in an easterly direction. Simultaneously with the above process, the regulating forks on the easterly rods (since they will shorten due to the telescopic motion to a length controlled simultaneously with the above) will return to their original position and will contact again the toothing of the smaller diameter gear wheels.

For this positioning the computer memory gives the data concerning the exact direction of sunrise as per the given calendar date, then compares them with those obtained from the light-diodes placed on the collectors, and corrects the program, should it be required. The sun following motion (North-South direction) is continuously performed too according to the computer program.

Until the end of the daily program or the operation, the computer continuously controls the direction of the collectors to be aimed at the sun. In case of temporary clouding, the computer follows the program characteristic of the given hour of the day. As soon as clouding is over, the computer controls again the aiming on basis of the data obtained from the light-diodes. Should it be required, it performs correction.

In case of operating trouble, on the immediate signals of the computer, the collectors will be turned away from the direction of the sun, and they will remain in this position until the trouble is eliminated. Then the collectors will be directed again toward the sun, as determined by the program on basis of the given hour of the day.

Simultaneously with the adjustment of the collectors in the morning, the control system starts to operate the feed pump mounted onto the pre-heating tank, as a result of which the evaporators will be filled with salt water up to the required level.

The solar rays received and focused by the collector will heat up the heat transferring agent in the tank fixed in the focus.

As soon as the temperature of the agent reaches the value detemined in the program, the electromagnetic valve or thermostat placed at the upper part of the tank opens the outlet hole giving way for the hot agent. The control system starts then the heat transferring agent forwarding pumps 15 which can be operated at several stages. The pumps 15 begin to operate at a low flowing velocity which will be increased as the temperature of the material will be higher during operation. At the noon hours, when the temperature is the highest, and heat storage tanks are filled up, the pumps work so quickly that the temperature of the heat transferring agent should not exceed the programmed critical value.

The pumps pass the hot heat transferring agent into the cylindrical heater 72 of the first evaporator 2, where—having passed through the vertical pipe starting from the inlet—, it will spread from the perforated ring running around the upper internal part of the heater 72, and flowing downwards on the ribs, it will leave the same at the opposite side after it has rejected its heat energy (FIG. 8 and 8.a.).

If a spiral pipe coil is used, the material, introduced at the top of the coil, flowing downwards by forced circulation, contacts a large surface and thus rejects its thermal energy.

If a cylindrical bundle of tubes is used as heater, the heat-transmission, inlet/outlet of the heating agent will be performed similarly. The cooled agent will be pumped 15 from the central pipeline into the tanks 20 in the collector focus 1. The closed primary thermal cycle for power transmission is performed this way.

Due to heating up, the salt water heated in the evaporator 2 will boil at the programmed, high temperature, and will be converted into steam. The over-heated steam—due to the high boiling point and the intensive heating—, passing through the vapor collector provided with drop catcher 81 (FIG. 8.) gets into the specially designed heating system 73 of the subsequent evaporator tank, where—having rejected its thermal energy—it heats up and evaporates the salt water in the evaporator.

Following the above process, the cooled vapor with reduced thermal energy—, by means of the condensate separator 74—leaving the evaporators, gets into the pre-heating tank 11, then into the distilled water storage tank 13. The vapor leaving the last evaporator tank 4 through a pipe is cooled in the bundle of tubes or in the pipe coil of the pre-heater, then in those of vapor condensing tank.

Finally, it is collected in the distilled water storage tank 13 through the outlet pipes. In case of multiple-effect evaporators, in the second evaporator tank as well as in those following it, vacuum should be produced which is gradually increasing, while the boiling temperature of the salt water to be evaporated will be reduced.

The continuous re-filling and feeding, resp. of the evaporators with salt water will be performed by the computer (control system) by means of the operation of the feed pump 106 mounted onto the sea water outlet pipe of the preheating tank 11. The computer will determine the parameters for the continuous re-filling of the evaporators on basis of the signals of the level gauges 83 mounted in the evaporator tanks. The continuous removal of the concentrated brine will be performed as follows: the concentration gauge 88 at the bottom, funnel-like part of the evaporators, as soon as the preliminarily determined value of brine concentration as per the program is reached (maximum concentration), gives signals to the computer. The discharge valve 77 controlled by the computer will open, and will remain open continuously until the brine concentration reaches the min. value according to the gauge. In the latter case the control system closes the valve.

A battery plant provides for the continuous power supply of the complete water desalinizing system. An electric power generating unit connected into the thermal cycle will supply the battery plant, as required.

The distilled water, taken out from the distilled water storage tank by a plunger pump, can be converted into potable water in a mixer vessel by means of additives available in unit packages (salts and trace elements). The majority of water—in the form of distilled water—can be used for industrial and agricultural purposes(irrigation, cleaning, washing, etc.). The water desalinizing equipment, subject of the invention, is capable of providing for its own electric power requirement by means of the power generating unit pertaining to it.

In order to meet the above requirement, a heat-exchanger 90 and a turbogenerator 96 are used (FIG. 9.). Part of the heat transferring agent heated up in the tanks 20 installed in the focus of the parabolic collectors 1 is conducted into a heat-insulated heat-exchanger 90 which is suitably designed and dimensioned according to the capacity and pressure as required for the electric supply of the equipment. The hot agent flowing through the heating pipe system of the heat-exchanger 90 (provided with specially designed plate ribs, or without the same) evaporates the water in the heat-exchanger. From the heat-exchanger, the overheated, high-pressure steam is passed through a suitably dimensioned turbogenerator of the required capacity 96, where the generating unit driven by the turbine will produce the required electric power.

The exhaust steam with decreased thermal energy, leaving the turbogenerator 96, will be condensed in the pipe coil 99 of a condenser 97 of the required dimension, connected into the cooling cycle—preferable the pipe coil of the sea water pre-heating tank—, or in a Heller-Forgo type cooling tower, and the water is to be conducted into the feed water tank 98. Herefrom, the feed pump controlled by the computer will continuously feed the condensate water in the required quantity into the heat-exchanger 90. Part of the exhaust steam expanded in the turbine and leaving the same, passing through the pipe coil of the feed water tank 98 will increase the temperature of the feed water, as required.

The computer with the pertaining control system will control and monitor the operation of the equipment according to the program. Power supply of the equipment for starting and operation will be provided for by the battery plant.

Figure 11:
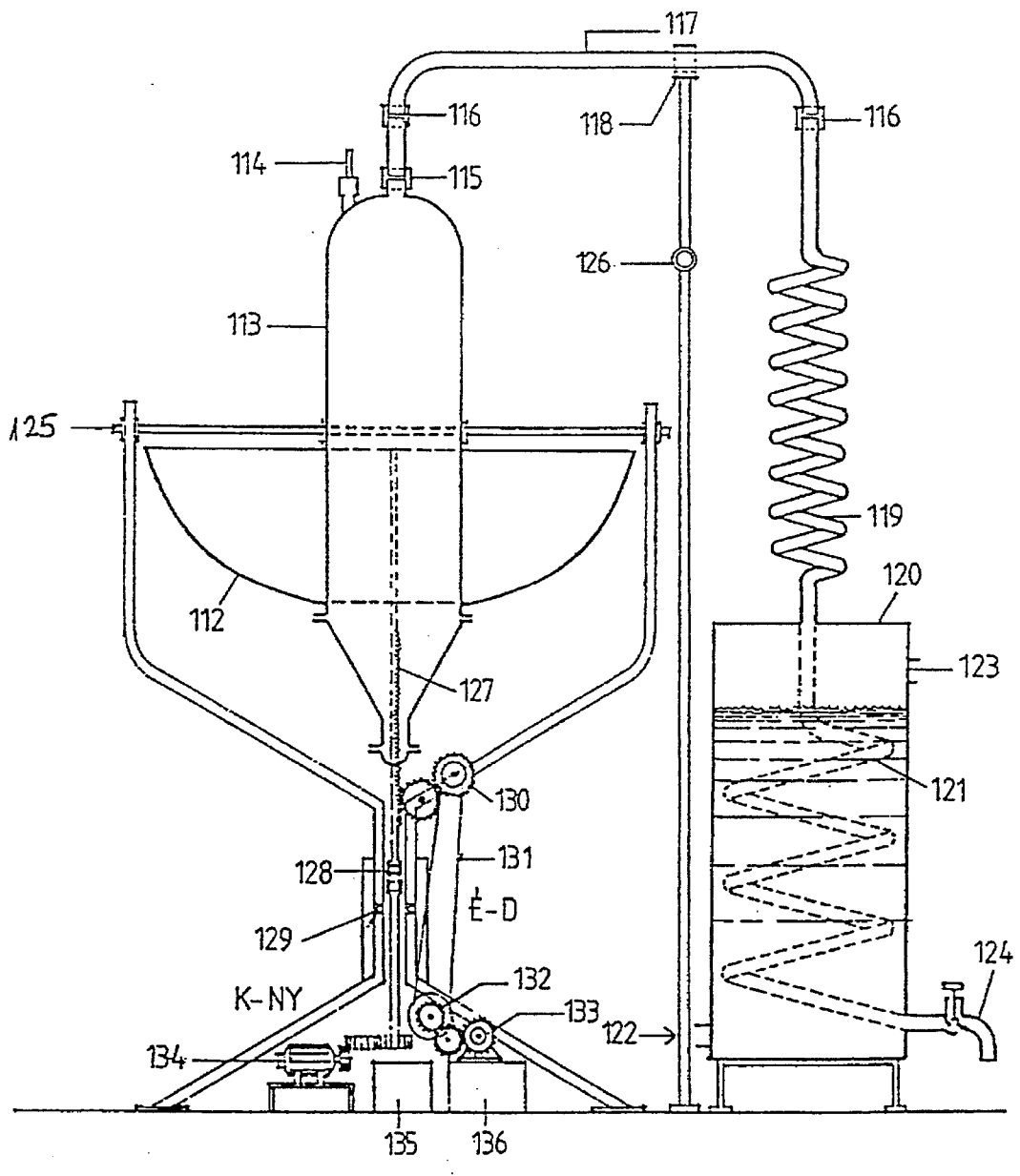

FIG. 11. shows a portable equipment which can be easily installed, disassembled and transported even by one person. In this construction the collector 112 and the evaporator tank 113 provided with a safety valve 114 are fixed to each other.

The evaporator tank 113 is joined 115 to a fixed pipe section, and is connected by a further joint 116 to the flexible pipeline composed of a straight section 117 and a spiral pipe 119. The multi-part pipeline for vapor outlet is conducted into the condenser 120, where it is continued in a pipe coil 121. Potable water can be taken by means of a cock 124 mounted at the end of the pipe coil 121 coming from the condenser. The flow-system of the condenser 120 increases the efficiency of cooling, i.e. cooling water is continuously routed into the condenser 120 through the inlet nozzle 112, and the warmed cooling water is discharged by means of the outlet nozzle 123. In this case the collector 112 is mounted onto a supporting stand 125, which enables the turning of the collector 112 around its horizontal and vertical axis. Turning around the vertical axis (N-S) is performed by an electromotor 133 provided with gear wheel by means of a gear wheel 132, a belt-driven 131 gear wheel 130 and a toothed rack 127 connecting to the electromotor. Turning around the horizontal axis (E-W) is also performed by an electromotor 134 as made possible by bearings 128 and 129. There is control unit 136 actuating the driving-133 and electromotors 134 to enable the sun-following motion. A battery plant 135 supplied by solar cells or an aggregate continuously supplies the unit with electric power.

Figure 12:
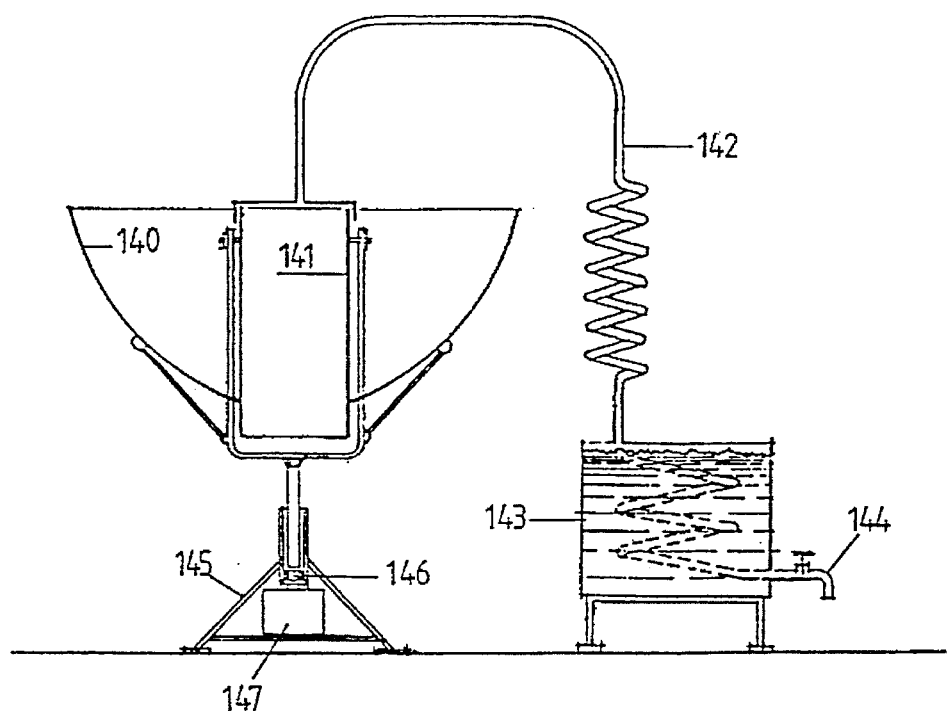
Figure 12:
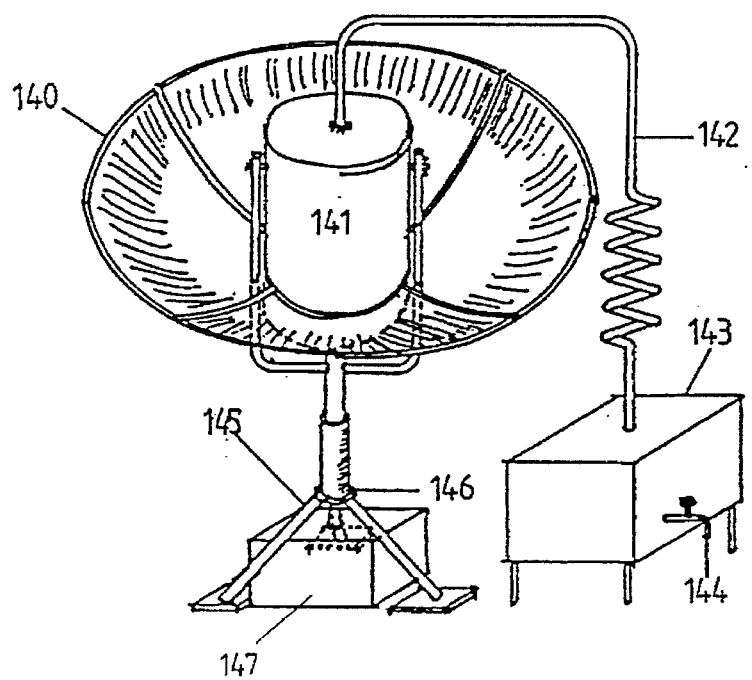

FIG. 12. shows a construction meeting very low requirements, and as far as its dimensions are concerned it can be placed in collapsible condition into the luggage rack of a car. In this case the collector 140 is joined in articulated manner to the heat receiving evaporator tank 141 and is mounted onto a stand 145.

During transport the size of the collector 140 can be decreased, since it is composed of more (in the Figure: four) foldable segments. The receiver tank with unscrewable lid 141 is equipped with a vapor outlet pipe 142 at top which is passed through a small cooling tank 143, and is provided with a cock 144 at the end leaving the cooling tank 143 for taking potable water. The collector 140 can be adjusted according to the N-S direction by hand, turned around the horizontal axis.

Figure 13A:
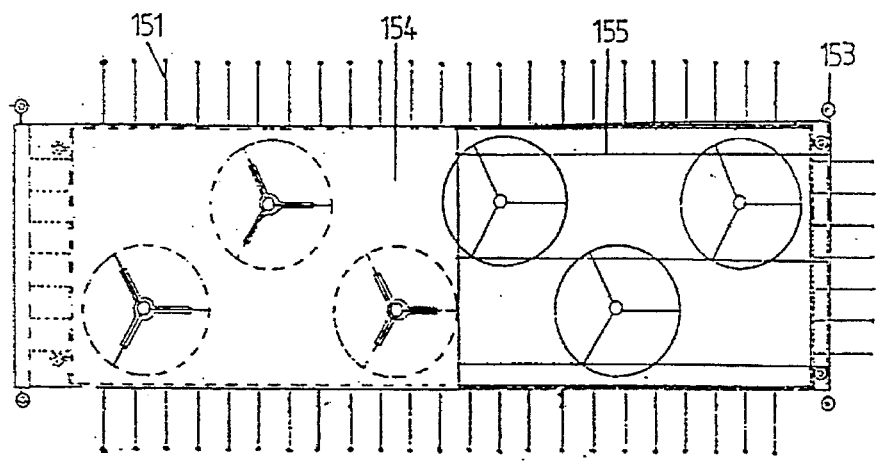
Figure 13B:
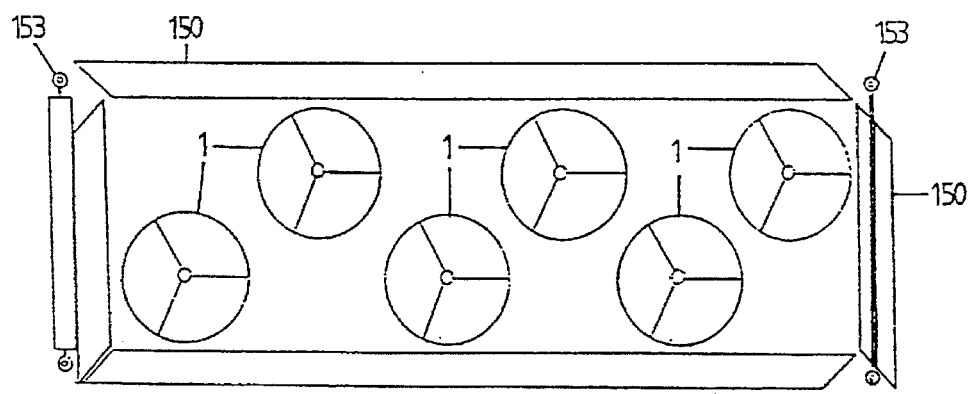
Figure 13C:
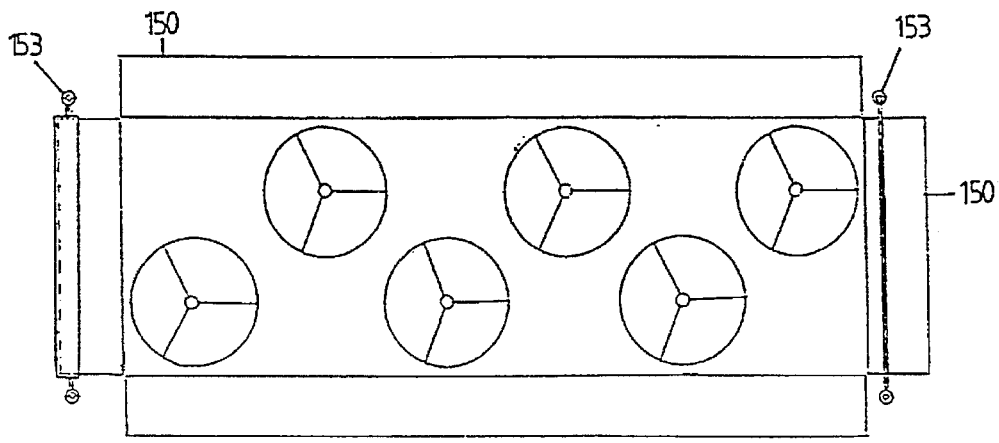

A clockwork drive 147 will perform rotation around the vertical axis conducted through the bearing 146. The collectors 1 are protected against wind—and sandstorm by a movable structure (FIG. 13.) having four side walls 150 and a cover 154 stretched over them. There is a circular cutting in the canvas exactly fitting to the receiver representing the highest point of the collector 1 (FIG. 15.). The side walls 150 of the protecting structure are composed of ribbed segments 156 connected to each other by means of guide rails 157 (FIG. 14); each of the segments end, at the bottom, in a shaft turnable in a bearing 158 and is connected to an electromotor 139. Ropes are applied to the external sides of the walls fixed at their upper and middle parts, hindering the inward motion of the walls deviating from the vertical direction. Vertical positioning of the side walls will be performed by an electromotor 159 and ropes 155 fixed to the upper part of the inner side and wound onto winches at the opposite sides. Electromagnetic fixing coils 161 (FIG. 13.a.) fix the side walls 150 at their top and bottom ends, similarly to the case of the perpendicular walls.

Figures 16A, 16B:
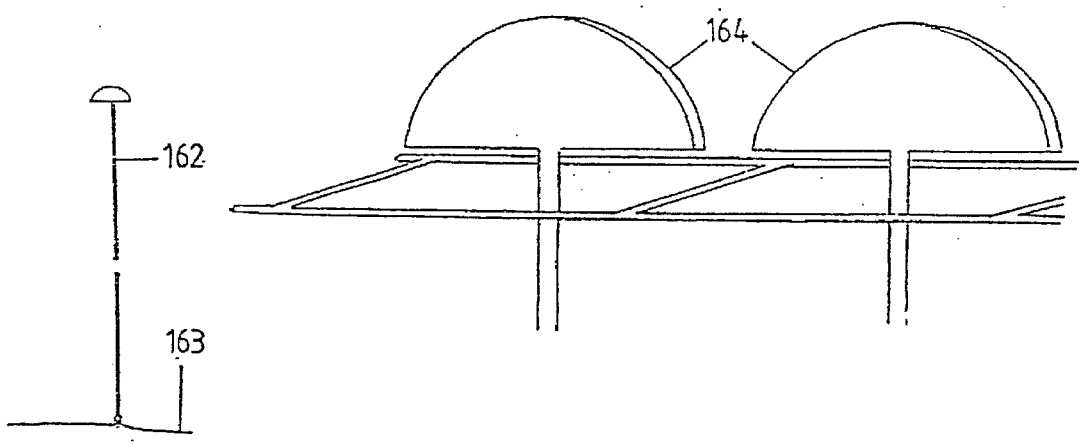
Figure 16C:
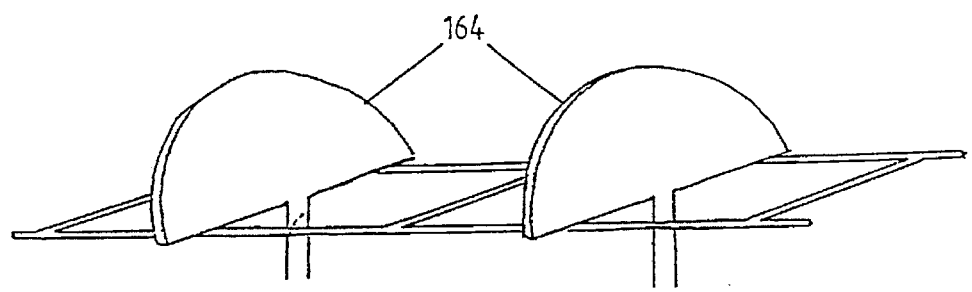

The side walls bear turnable fixing rods 162 perpendicular to their longitudinal direction, connected to each other by a rotating rope 163. The fixing rods 162 end in semicircular flat head 164 at top (FIG. 16.). This construction enables the heads 164 of the fixing rods 162 to reeve through the slots made in the covering canvas 154 that covers the sidewalls from top. As soon as the canvas is spread out in its total length, the magnet sucking coils at the sidewall ends will turn the fixing rods 162 at the right angle by moving the rotating ropes 163, as a result of which the heads 164 of the fixing rods 162 fix the stretched canvas. There is a hydraulic supporting rod 153 provided with an electromotor and a stretcher at one of the extreme points of the longer side of the area to be protected; while the opposite side is provided with a winch-shaft supporting hydraulic rod 153 equipped with a stretcher fixing the ropes 155.

The sea water desalinizing plant, utilizing solar energy—subject of the invention—offers the following advantages:

The power source of the plant is solar energy which is available in unlimited quantity, at no cost. The manufacturing and investment costs will be covered many times over since no expensive fuels are required for the operation contrary to the traditional equipment.

The plant will not pollute the environment and will not make even noise.

It can excellently serve smaller or scattering habitations, hotels, lonely cottages, rest-homes, farms. It can be used for irrigation purposes, too. The equipment can be located anywhere in the ambiency of the sea-side or an artesian well, independently of any traditional power source.

Its operation is totally automatized, and needs no permanent supervision. Compared to the plant operating flat collectors, this one is far more efficient due to its sunshine concentrating capacity of sun-following motion.

Also, is can be operated solely as a power generating unit far away from the roads and the electric network, offering inexpensive power source the investment costs of which will be recovered quickly.

The production cost of the plant is favorable. Should it be required, it is also possible to manufacture a plant of a reduced size.

If used as a sea-water desalinizing unit, no water pre-treatment will be required, which means a considerable cost reduction.

During the sea water desalinizing process crystallized salts and other mineral products can be obtained which are important raw materials for the industry.

I claim:

1. Apparatus for desalination of sea water by the utilization of solar energy for distillation of said sea water, comprising a heat caption unit that automatically follows the movement of the sun serving as a heat source, a sea water collecting tank, a pre-heating tank having a discharge duct, a plurality of evaporators which serve to evaporate steam out of sea water, said plurality of evaporators being connected in series, and distilled water storage tanks; said preheating tank which pre-heats the sea water and cools the steam and said sea water collecting tank being situated beside each other at different levels, the adjoining walls of the two tanks having an opening for a through-flow tube; the discharge duct of the preheating tank connecting into the plurality of evaporators, the first of the plurality of evaporators having a heating agent inlet and a heater heated by the heating agent, the second and the subsequent evaporators having a heating system consisting of pipe rings utilizing hot vapor and pipes connecting the pipe rings, at least one parabolic collector made up of module elements serving as heat collecting units for heating the heating agent that heats the first evaporator, said heat collecting units having a funnel-shape means with a bottom hollow, a high heat-resistant metal or ceramic coating covering the wall of said means, a heat receiver means having an inlet pipe and a discharge pipe, baffle plates or pipe bundles inside said receiver for heating the heating agent, wherein the inlet pipe of the receiver is connected to a discharge pipe of the first evaporator discharging a cooled heating agent, while the discharge pipe of the receiver is connected to the heating agent inlet of the first evaporator.

2. The apparatus according to claim 1, wherein the heat receiver is connected directly or indirectly to a heat-exchanger that is connected to a turbogenerator.

3. The apparatus according to claim 2 wherein the heat exchanger consists of a boiler drum provided at its top with an inlet pipe section for the heating agent and at its bottom with a discharge pipe section for the cooled heating agent said inlet pipe section and said discharge pipe section connected inside the boiler drum by a heating system consisting of pipe rings and pipes which join said pipe rings; wherein a feed water tank is connected through a feed pump and a pipeline to the heat exchanger, and on the upper part the turbo-generator is driven by high-pressure vapor discharge pipe; and an expanded vapor, after leaving the turbo generator is ducted into a condenser and thence into the feed water tank.

4. The apparatus according to claim 1 wherein the at least one parabolic collector has a frame structure made of glass-texture reinforced synthetic resin, with oval ribs and annular rings perpendicular to the ribs, including a topmost and a lowest ring, where the topmost ring and the lowest ring fix the ribs by pin joint and gluing; said frame structure further having a parabolic mirror assembled from segments fixed to it; and said mirror being provided with a reflecting surface on its inner surface.

5. The apparatus according to claim 4, wherein the at least one parabolic collector has an upper orifice, and each segment of the parabolic mirror is adjustably fixed by spring bolts with washers, and there is a supporting structure fixing the receiver, and said supporting structure is fixed to said upper orifice of the at least one parabolic collector.

6. The apparatus according to claim 4 wherein the shape of an outer surface of the segments is provided and maintained by bracing ribs.

7. The apparatus according to claim 1 wherein the at least one parabolic collector is supported by a support construction which has ball-and-socket construction fixed to its foundation, consisting of a hollow steel ball, a lower bearing part formed as a hollow to fit said hollow steel ball and coated by metal-steamed lead, and an upper bearing part, fixed to the at least one parabolic collector, formed as a basket to fit said hollow steel ball and also fixed to the support construction.

8. The apparatus according to claim 7, wherein the inlet pipe and discharge pipe of the receiver are routed through an opening in the center of the at least one parabolic collector and the inlet pipe and discharge pipe of the receiver then pass through the upper bearing and the hollow steel ball supporting the at least one parabolic collector, where the upper bearing part and the hollow steel ball are fixed to each other; further, perpendicularly situated pipe sections are connected to pipe sections leading from the hollow steel ball jointed by vertical pipe sections provided with elbows protruding into the pipe section in sealed condition.

9. The apparatus according to claim 1 wherein the at least one parabolic collector is fixed in place by pairs of telescopic rods and one of each pair of rods is equipped with a remote-controllable driving mechanism, the other, non-driven rod in each pair being provided with position fixing lock gear, and the driving mechanism of driven rods being formed so that a toothed rack is attached to the upper part of the telescopic rods on both sides, and at its bottom part an electric motor having a shaft is situated with a gear wheel on its shaft, coupling through other gear wheels to the rack fixed to the upper part; the position fixing lock gear of the telescopic non-driven rods being formed so that a toothed rack is connected on both sides of the telescopic rods at its upper part, and at the bottom part locking forks and an electromagnetic coil for releasing the forks are situated, where gear wheels are coupled with the rack on both sides, fastened with a smaller diameter, helical toothed gear and the locking forks are connected to the helical toothed gears.

10. The apparatus according to claim 1 wherein the first evaporator is provided with cleaning blades to promote heat transfer and hinder deposits on the heater; wherein the plurality of evaporators following the first evaporator are each followed by a condensate separator, cooled steam passing after treatment in the evaporators into the tank pre-heating sea water, which serves as a condenser, wherein a pump is fitted into a pipe discharging vapor from the tank preheating sea water, producing vacuum in the tank, and a vapor discharge pipe of the last evaporator tank, provided with a vacuum pump, is jointed after the discharge pipe of the preheating vapor and passes through the sea water pre-heating tank which further cools the distilled water.

11. The apparatus according to claim 1, wherein the steam produces a pressure, which pressure is used to generate electric power.

* * * * *

UNITED STATES PATENT AND TRADEMARK OFFICE
CERTIFICATE OF CORRECTION

PATENT NO.: 5,645,693

DATED: July 8, 1997

INVENTOR(S): Gabor GÖDE

It is certified that error appears in the above-identified patent and that said Letters Patent is hereby corrected as shown below:

Column 17, claim 1, line 56, "pipe rings," should be --pipe rings;--.

Column 17, claim 1, line 61, delete "means", second occurrence.

Column 18, claim 9, line 66, delete "telescopic".

Signed and Sealed this

Fourteenth Day of October, 1997

Attest:

BRUCE LEHMAN

Attesting Officer

Commissioner of Patents and Trademarks